(12) United States Patent
Salajegheh et al.

(10) Patent No.: US 9,703,962 B2
(45) Date of Patent: Jul. 11, 2017

(54) METHODS AND SYSTEMS FOR BEHAVIORAL ANALYSIS OF MOBILE DEVICE BEHAVIORS BASED ON USER PERSONA INFORMATION

(71) Applicant: QUALCOMM Incorporated, San Diego, CA (US)

(72) Inventors: Mastooreh Salajegheh, San Jose, CA (US); Vinay Sridhara, Santa Clara, CA (US); Yin Chen, Campbell, CA (US); Rajarshi Gupta, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 76 days.

(21) Appl. No.: 14/510,772

(22) Filed: Oct. 9, 2014

(65) Prior Publication Data

US 2016/0103996 A1 Apr. 14, 2016

(51) Int. Cl.
*G06F 21/31* (2013.01)
*H04L 29/06* (2006.01)
(Continued)

(52) U.S. Cl.
CPC ........ *G06F 21/577* (2013.01); *G06F 11/3024* (2013.01); *G06F 11/3438* (2013.01);
(Continued)

(58) Field of Classification Search
CPC ... G06F 21/316; G06F 21/566; H04L 63/1408
See application file for complete search history.

(56) References Cited

U.S. PATENT DOCUMENTS

| 7,940,186 B2 * | 5/2011 | Aaron ............... G06Q 30/02 340/522 |
| 8,589,328 B1 | 11/2013 | Sharma |

(Continued)

OTHER PUBLICATIONS

Faddoul et al. "Boosting Multi-Task Weak Learners with Applications to Textual and Social Data", Proceedings of the Ninth Intl Conf. on Machine Learning and Applications (ICMLA) pp. 367-372 (2010).*

(Continued)

*Primary Examiner* — Jason C Chiang
(74) *Attorney, Agent, or Firm* — The Marbury Law Group, PLLC

(57) ABSTRACT

A computing device processor may be configured with processor-executable instructions to implement methods of using behavioral analysis and machine learning techniques to identify, prevent, correct, or otherwise respond to malicious or performance-degrading behaviors of the computing device. As part of these operations, the processor may generate user-persona information that characterizes the user based on that user's activities, preferences, age, occupation, habits, moods, emotional states, personality, device usage patterns, etc. The processor may use the user-persona information to dynamically determine the number of device features that are monitored or evaluated in the computing device, to identify the device features that are most relevant to determining whether the device behavior is not consistent with a pattern of ordinary usage of the computing device by the user, and to better identify or respond to non-benign behaviors of the computing device.

20 Claims, 8 Drawing Sheets

(51) Int. Cl.
*G06F 21/56* (2013.01)
*G06F 21/57* (2013.01)
*G06F 11/30* (2006.01)
*G06F 11/34* (2006.01)
*G06F 21/55* (2013.01)

(52) U.S. Cl.
CPC .......... *G06F 21/316* (2013.01); *G06F 21/552* (2013.01); *H04L 63/145* (2013.01); *H04L 63/1425* (2013.01)

(56) References Cited

U.S. PATENT DOCUMENTS

| | | | | |
|---|---|---|---|---|
| 8,671,347 | B2* | 3/2014 | Bromer | G06F 3/011 |
| | | | | 715/744 |
| 9,256,748 | B1* | 2/2016 | Gates | G06F 21/60 |
| 2007/0089125 | A1* | 4/2007 | Claassen | H04H 60/33 |
| | | | | 725/9 |
| 2008/0318563 | A1 | 12/2008 | Ross et al. | |
| 2009/0199296 | A1 | 8/2009 | Xie et al. | |
| 2010/0269175 | A1* | 10/2010 | Stolfo | G06F 21/55 |
| | | | | 726/22 |
| 2011/0145920 | A1* | 6/2011 | Mahaffey | G06F 21/564 |
| | | | | 726/22 |
| 2013/0031599 | A1 | 1/2013 | Luna et al. | |
| 2013/0097706 | A1* | 4/2013 | Titonis | G06F 21/56 |
| | | | | 726/24 |
| 2013/0178195 | A1* | 7/2013 | Luna | H04W 24/04 |
| | | | | 455/414.1 |
| 2013/0282627 | A1* | 10/2013 | Faddoul | H04L 12/585 |
| | | | | 706/12 |
| 2013/0305357 | A1* | 11/2013 | Ayyagari | H04L 63/14 |
| | | | | 726/22 |
| 2014/0181971 | A1 | 6/2014 | Tatarinov et al. | |
| 2014/0237595 | A1 | 8/2014 | Sridhara et al. | |
| 2014/0317726 | A1* | 10/2014 | Turgeman | G06F 21/32 |
| | | | | 726/19 |
| 2014/0344927 | A1* | 11/2014 | Turgeman | H04W 12/06 |
| | | | | 726/22 |
| 2015/0318998 | A1* | 11/2015 | Erlikhman | H04L 9/3271 |
| | | | | 713/171 |

OTHER PUBLICATIONS

International Search Report and Written Opinion—PCT/US2015/044578—ISA/EPO—Oct. 26, 2015.

* cited by examiner

METHODS AND SYSTEMS FOR BEHAVIORAL ANALYSIS OF MOBILE DEVICE BEHAVIORS BASED ON USER PERSONA INFORMATION

BACKGROUND

Cellular and wireless communication technologies have seen explosive growth over the past several years. Wireless service providers now offer a wide array of features and services that provide their users with unprecedented levels of access to information, resources and communications. To keep pace with these enhancements, personal and consumer electronic devices (e.g., cellular phones, watches, headphones, remote controls, etc.) have become more powerful and complex than ever, and now commonly include powerful processors, large memories, and other resources that allow for executing complex and powerful software applications on their devices.

Due to these and other improvements, personal and consumer electronic devices are becoming ubiquitous in modern life, and have unprecedented levels of access to information that is generated by, or which relates to, their users. In addition, people frequently use their devices to store sensitive information (e.g., credit card information, contacts, etc.) and/or to accomplish tasks for which security is important. For example, mobile device users frequently use their devices to purchase goods, send and receive sensitive communications, pay bills, manage bank accounts, and conduct other sensitive transactions. Due to these trends, personal and consumer electronic devices are quickly becoming the next frontier for malware and cyber attacks. Accordingly, new and improved security solutions that better protect resource-constrained computing devices, such as mobile and wireless devices, will be beneficial to consumers.

SUMMARY

The various aspects include methods of analyzing a device behavior in a computing device (e.g., a mobile computing device, etc.) by monitoring in a processor of the computing device activities of a software application operating on the computing device to generate user-persona information that characterizes a user of the computing device, and using the user-persona information to determine whether the device behavior is non-benign. In an aspect, using the user-persona information to determine whether the device behavior is non-benign may include using the generated user-persona information to dynamically determining device features to be monitored or evaluated in the computing device so as to balance tradeoffs between performance and security. In an aspect, using the user-persona information to determine whether the device behavior is non-benign may include using the generated user-persona information to identify device features that are most relevant to determining whether the device behavior is not consistent with a pattern of ordinary usage of the computing device by the user.

In an aspect, using the user-persona information to determine whether the device behavior is non-benign may include monitoring the identified device features to collect behavior information, generating a behavior vector that characterizes the collected behavior information, and applying the generated behavior vector to a classifier model to determine whether the device behavior is non-benign. In an aspect, the method may include generating a user-specific classifier model that evaluates the identified device features, and applying the generated behavior vector to the classifier model to determine whether the device behavior is non-benign may include applying the generated behavior vector to the user-specific classifier model to determine whether the device behavior is non-benign. In an aspect, generating the user-specific classifier model that evaluates the identified device features may include receiving a full classifier model that includes a plurality of test conditions, identifying test conditions in the plurality of test conditions that evaluate the identified device features, and generating the user-specific classifier model to include identified test conditions.

In an aspect, applying the generated behavior vector to the user-specific classifier model to determine whether the device behavior is non-benign may include applying the generated behavior vector to the user-specific classifier model so as to evaluate each test condition included in the user-specific classifier model, computing a weighted average of each result of evaluating test conditions in the user-specific classifier model, and determining whether the device behavior is non-benign based on the computed weighted average. In an aspect, monitoring activities of the software application may include monitoring a user-interaction between the user and the software application. In an aspect, generating the user-persona information may include generating information that characterizes the user's mood.

In an aspect, the method may include determining whether the user's mood is relevant to analyzing behavior information collected by monitoring device features. In an aspect, the method may include generating a behavior vector that correlates the collected behavior information for which the user's mood is relevant to the user's mood at the time the behavior information was collected, and applying the generated behavior vector to a classifier model to determine whether the device behavior is non-benign. In an aspect, the method may include generating a classifier model that includes a decision node that evaluates a device feature in relation to the user's mood, and applying a behavior vector to the classifier model to determine whether the device behavior is non-benign.

Further aspects may include a computing device having a processor configured with processor-executable instructions to perform operations that may include monitoring activities of a software application operating on the computing device to generate user-persona information that characterizes a user of the computing device, and using the user-persona information to determine whether a device behavior is non-benign. In an aspect, the processor may be configured with processor-executable instructions to perform operations such that using the user-persona information to determine whether the device behavior is non-benign includes using the generated user-persona information to dynamically determining device features to be monitored or evaluated in the computing device so as to balance tradeoffs between performance and security. In an aspect, the processor may be configured with processor-executable instructions to perform operations such that using the user-persona information to determine whether the device behavior is non-benign includes using the generated user-persona information to identify device features that are most relevant to determining whether the device behavior is not consistent with a pattern of ordinary usage of the computing device by the user.

In an aspect, the processor may be configured with processor-executable instructions to perform operations such that using the user-persona information to determine whether the device behavior is non-benign further includes monitoring the identified device features to collect behavior information, generating a behavior vector that characterizes the collected behavior information, and applying the generated behavior vector to a classifier model to determine whether the device behavior is non-benign. In an aspect, the processor may be configured with processor-executable instructions to perform operations further including generating a user-specific classifier model that evaluates the identified device features. In an aspect, the processor may be configured with processor-executable instructions to perform operations such that applying the generated behavior vector to the classifier model to determine whether the device behavior is non-benign includes applying the generated behavior vector to the user-specific classifier model to determine whether the device behavior is non-benign.

In an aspect, the processor may be configured with processor-executable instructions to perform operations such that generating the user-specific classifier model that evaluates the identified device features includes receiving a full classifier model that includes a plurality of test conditions, identifying test conditions in the plurality of test conditions that evaluate the identified device features, and generating the user-specific classifier model to include identified test conditions. In an aspect, applying the generated behavior vector to the user-specific classifier model to determine whether the device behavior is non-benign includes applying the generated behavior vector to the user-specific classifier model so as to evaluate each test condition included in the user-specific classifier model, computing a weighted average of each result of evaluating test conditions in the user-specific classifier model, and determining whether the device behavior is non-benign based on the computed weighted average.

In an aspect, the processor may be configured with processor-executable instructions to perform operations such that generating the user-persona information includes generating information that characterizes the user's mood. In an aspect, the processor may be configured with processor-executable instructions to perform operations further including determining whether the user's mood is relevant to analyzing behavior information collected by monitoring device features, generating a classifier model that includes a decision node that evaluates a device feature in relation to the user's mood in response to determining that the user's mood is relevant to analyzing the behavior information collected by monitoring the device features, generating a behavior vector that correlates the collected behavior information for which the user's mood is relevant to the user's mood at the time the behavior information was collected, and applying the generated behavior vector to the classifier model to determine whether the device behavior is non-benign.

Further aspects include non-transitory computer readable storage medium having stored thereon processor-executable software instructions configured to cause a processor of a computing device to perform operations for analyzing a device behavior in the computing device, the operations including monitoring activities of a software application operating on the computing device to generate user-persona information that characterizes a user of the computing device, and using the user-persona information to determine whether the device behavior is non-benign. In an aspect, the stored processor-executable software instructions may be configured to cause a processor to perform operations such that using the user-persona information to determine whether the device behavior is non-benign includes using the generated user-persona information to dynamically determining device features to be monitored or evaluated in the computing device so as to balance tradeoffs between performance and security. In an aspect, the stored processor-executable software instructions may be configured to cause a processor to perform operations such that using the user-persona information to determine whether the device behavior is non-benign includes using the generated user-persona information to identify device features that are most relevant to determining whether the device behavior is not consistent with a pattern of ordinary usage of the computing device by the user.

In an aspect, the stored processor-executable software instructions may be configured to cause a processor to perform operations such that using the user-persona information to determine whether the device behavior is non-benign includes monitoring the identified device features to collect behavior information, generating a behavior vector that characterizes the collected behavior information, and applying the generated behavior vector to a classifier model to determine whether the device behavior is non-benign. In an aspect, the stored processor-executable software instructions may be configured to cause a processor to perform operations further including generating a user-specific classifier model that evaluates the identified device features.

In an aspect, the stored processor-executable software instructions may be configured to cause a processor to perform operations such that applying the generated behavior vector to the classifier model to determine whether the device behavior is non-benign includes applying the generated behavior vector to the user-specific classifier model to determine whether the device behavior is non-benign. In an aspect, the stored processor-executable software instructions may be configured to cause a processor to perform operations such that generating the user-specific classifier model that evaluates the identified device features includes receiving a full classifier model that includes a plurality of test conditions, identifying test conditions in the plurality of test conditions that evaluate the identified device features, and generating the user-specific classifier model to include identified test conditions. In an aspect, the stored processor-executable software instructions may be configured to cause a processor to perform operations such that applying the generated behavior vector to the user-specific classifier model to determine whether the device behavior is non-benign includes applying the generated behavior vector to the user-specific classifier model so as to evaluate each test condition included in the user-specific classifier model, computing a weighted average of each result of evaluating test conditions in the user-specific classifier model, and determining whether the device behavior is non-benign based on the computed weighted average.

In an aspect, the stored processor-executable software instructions may be configured to cause a processor to perform operations such that generating the user-persona information includes generating information that characterizes the user's mood. In an aspect, the stored processor-executable software instructions may be configured to cause the processor to perform operations that further include determining whether the user's mood is relevant to analyzing behavior information collected by monitoring device features, generating a classifier model that includes a decision node that evaluates a device feature in relation to the user's mood in response to determining that the user's mood is relevant to analyzing the behavior information collected by monitoring the device features, generating a behavior vector that correlates the collected behavior information for which the user's mood is relevant to the user's mood at the time the behavior information was collected, and applying the generated behavior vector to the classifier model to determine whether the device behavior is non-benign.

Further aspects may include a computing device that includes means for monitoring activities of a software application operating on the computing device to generate user-persona information that characterizes a user of the computing device, and means for using the user-persona information to determine whether a device behavior is non-benign. In an aspect, means for using the user-persona information to determine whether the device behavior is non-benign includes means for using the generated user-persona information to identify device features that are most relevant to determining whether the device behavior is not consistent with a pattern of ordinary usage of the computing device by the user. In an aspect, means for using the user-persona information to determine whether the device behavior is non-benign further includes means for monitoring the identified device features to collect behavior information, means for generating a behavior vector that characterizes the collected behavior information, and means for applying the generated behavior vector to a classifier model to determine whether the device behavior is non-benign.

In an aspect, the computing device further including means for generating a user-specific classifier model that evaluates the identified device features, and the means for applying the generated behavior vector to the classifier model to determine whether the device behavior is non-benign may include means for applying the generated behavior vector to the user-specific classifier model to determine whether the device behavior is non-benign. In an aspect, means for generating the user-specific classifier model that evaluates the identified device features may include means for receiving a full classifier model that includes a plurality of test conditions, means for identifying test conditions in the plurality of test conditions that evaluate the identified device features, and means for generating the user-specific classifier model to include identified test conditions.

In an aspect, means for applying the generated behavior vector to the user-specific classifier model to determine whether the device behavior is non-benign may include means for applying the generated behavior vector to the user-specific classifier model so as to evaluate each test condition included in the user-specific classifier model, means for computing a weighted average of each result of evaluating test conditions in the user-specific classifier model, and means for determining whether the device behavior is non-benign based on the computed weighted average.

In an aspect, means for generating the user-persona information may include means for generating information that characterizes the user's mood, and the computing device may further include means for determining whether the user's mood is relevant to analyzing behavior information collected by monitoring device features, means for generating a classifier model that includes a decision node that evaluates a device feature in relation to the user's mood in response to determining that the user's mood is relevant to analyzing the behavior information collected by monitoring the device features, means for generating a behavior vector that correlates the collected behavior information for which the user's mood is relevant to the user's mood at the time the behavior information was collected, and means for applying the generated behavior vector to the classifier model to determine whether the device behavior is non-benign.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
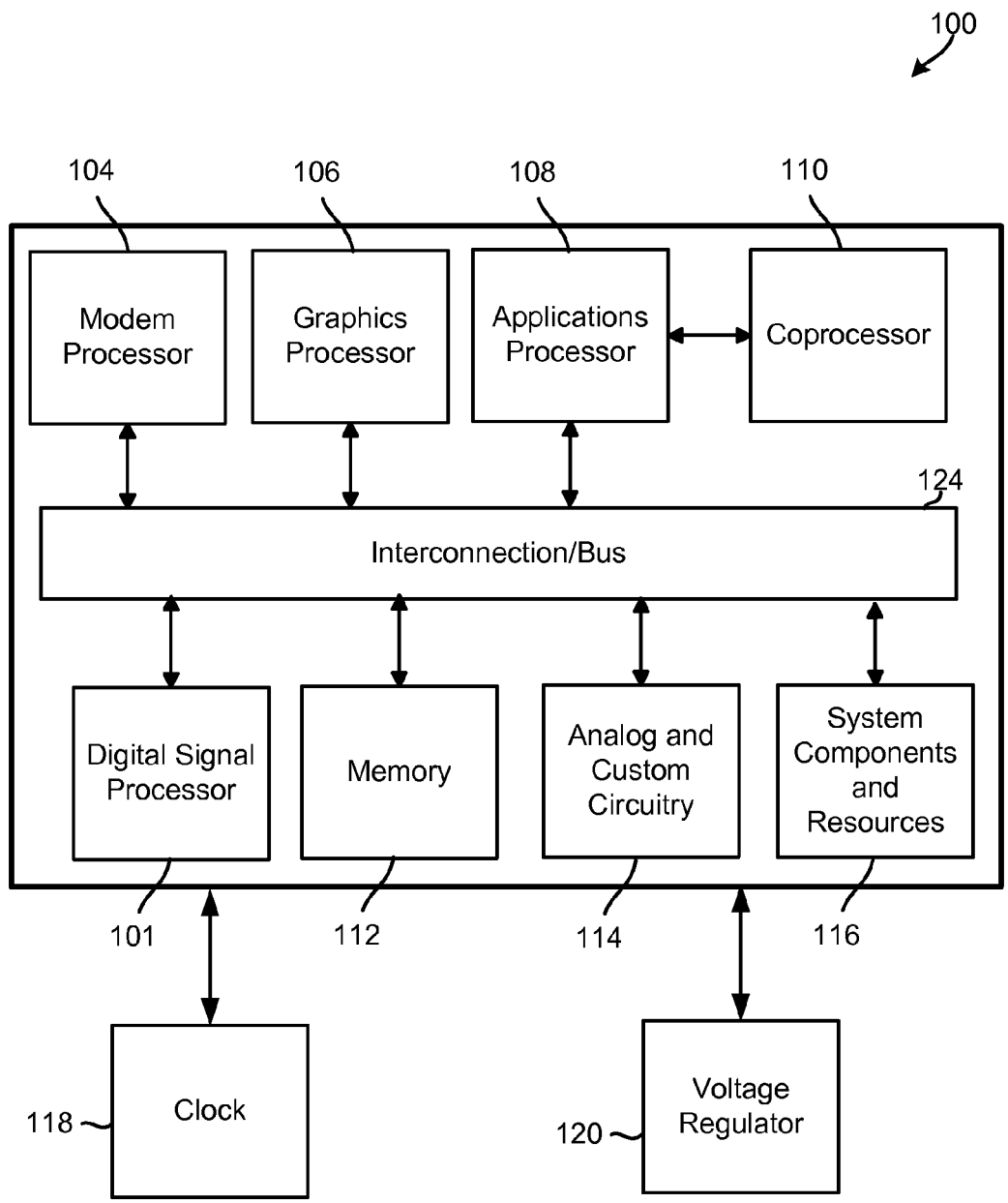
FIG. 1 is an architectural diagram of an example system on chip suitable for implementing the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the various aspects include methods, and computing devices configured to implement the methods, of using behavioral analysis and machine learning techniques to identify, prevent, correct, and/or otherwise respond to behaviors of the computing device that are non-benign (e.g., behaviors caused by malicious or performance-degrading software applications, etc.) based in part on the user's persona as recognized by the computing device. The computing device may be configured to identify a device user's distinct personality traits, to learn his or her device usage patterns over time, and/or to generate user-persona information that characterizes the user (the user's persona) by identifying or characterizing his or her activities, preferences, age, occupation, habits, moods, emotional states, personality, device usage patterns, etc. The computing device may be configured to use any or all such information to better identify or respond to non-benign behaviors of the computing device.

In an aspect, the computing device processor may be configured to identify a user (or users) of the device, generate user-persona information that characterizes the personality, activities, preferences, personality traits, device usage patterns, habits, moods, emotional states, etc. of the identified user(s), and use the user-persona information to identify the factors or features of the computing device that are most relevant to determining whether a detected/monitored device behavior is consistent with the ordinary usage patterns of that device by the identified user. The computing device processor may then monitor the identified factors/features to collect behavior information, generate behavior vectors that characterize the collected behavior information, generate user-specific classifier models that test or evaluate the identified factors/features, and apply the generated behavior vectors to the user-specific classifier models to intelligently determine whether a behavior, software application, or process of the device is non-benign (e.g., malicious, performance degrading, etc.).

In further aspects, the computing device processor may be configured to use the user-persona information to intelligently prioritize and/or dynamically determine the number of device features that are to be monitored or analyzed in the device so as to balance tradeoffs between accuracy of the behavior classification and the performance of the device. For example, the computing device processor may be configured to automatically increase the number of device features that are monitored or analyzed so as to increase the accuracy of the behavior classification (and thus improve the device's security) when the user-persona information indicates that there is a high probability that the user is a child or not very computer savvy. On the other hand, the device processor may decrease the number of device features that are monitored or analyzed (i.e., reduce the device's security level) to improve the processor's performance when the user-persona information indicates that the user is an avid gamer who frequently modifies the device's advanced configurations (e.g., overclocks the processor, etc.).

By learning and characterizing the personality, activities, device usage patterns, habits, moods, emotional states, etc. of the identified user, and using this information to evaluate device behaviors, the various aspects improve the functioning of the computing device by allowing the computing device to more accurately identify, prevent, correct, and/or otherwise respond to non-benign software applications and other undesirable device behaviors. Further, by performing such operations locally in the computing device, the various aspects allow the computing device to collect and use detailed personal information of the user to improve the security, performance, and power consumption characteristics of the computing device without compromising the user's privacy.

The various aspects also improve the functioning of the computing device by allowing the computing device (or behavior-based monitoring and analysis system of the computing device) to use the user-persona information to intelligently focus its monitoring and/or analysis operations on the device features that are most important for identifying and classifying non-benign device behaviors. For example, the computing device processor may be configured to prioritize the device features to focus on identifying and responding to phishing attacks when the user-persona information indicates that the user is a senior citizen that lives in a retirement home (a demographic that is known to be more susceptible to phishing attacks). Such intelligent use of user-persona information improves the accuracy of the behavior classification operations, and reduces their impact on the responsiveness, performance, and power consumption characteristics of the device. As such, the various aspects are well suited for inclusion and use in mobile and resource constrained-computing devices, such as smartphones, which have limited resources, run on battery power, and for which performance is important.

Additional improvements to the functions, functionalities, and/or functioning of computing devices will be evident from the detailed descriptions of the aspects provided below.

The term "performance degradation" is used in this application to refer to a wide variety of undesirable operations and characteristics of a computing device, such as longer processing times, slower real time responsiveness, lower battery life, loss of private data, malicious economic activity (e.g., sending unauthorized premium SMS message), denial of service (DoS), poorly written or designed software applications, malicious software, malware, viruses, fragmented memory, operations relating to commandeering the mobile device or utilizing the phone for spying or botnet activities, etc. Also, behaviors, activities, and conditions that degrade performance for any of these reasons are referred to herein as "not benign" or "non-benign."

The terms "mobile computing device" and "mobile device" are used interchangeably herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices which include a memory, a programmable processor for which performance is important, and operate under battery power such that power conservation methods are of benefit. While the various aspects are particularly useful for mobile computing devices, such as smartphones, which have limited resources and run on battery, the aspects are generally useful in any electronic device that includes a processor and executes application programs.

Generally, the performance and power efficiency of a mobile device degrade over time. Recently, anti-virus companies (e.g., McAfee, Symantec, etc.) have begun marketing mobile anti-virus, firewall, and encryption products that aim to slow this degradation. However, many of these solutions rely on the periodic execution of a computationally-intensive scanning engine on the mobile device, which may consume many of the mobile device's processing and battery resources, slow or render the mobile device useless for extended periods of time, and/or otherwise degrade the user experience. In addition, these solutions are typically limited to detecting known viruses and malware, and do not address the multiple complex factors and/or the interactions that often combine to contribute to a mobile device's degradation over time (e.g., when the performance degradation is not caused by viruses or malware). For these and other reasons, existing anti-virus, firewall, and encryption products do not provide adequate solutions for identifying the numerous factors that may contribute to a mobile device's degradation over time, for preventing mobile device degradation, or for efficiently restoring an aging mobile device to its original condition.

Further, modern mobile devices are highly configurable and complex systems. As such, the features that are most important for determining whether a particular device behavior is benign or non-benign (e.g., malicious or performance-degrading) may be different in each mobile device. In addition, there are a large variety of factors that may contribute to the degradation in performance and power utilization levels of a mobile computing device over time, including poorly written or designed software applications, malware, viruses, fragmented memory, background processes, etc. Due to the number, variety, and complexity of these factors, it is often not feasible to evaluate all of the factors that may contribute to the degradation in performance and/or power utilization levels of the complex yet resource-constrained systems of modern mobile computing devices. As such, it is difficult for users, operating systems, and/or application programs (e.g., anti-virus software, etc.) to accurately and efficiently identify the sources of problems. As a result, mobile device users currently have few remedies for preventing the degradation in performance and power utilization levels of a mobile device over time, or for restoring an aging mobile device to its original performance and power utilization levels.

To overcome the limitations of existing solutions, the various aspects include computing devices equipped with a behavioral monitoring and analysis system configured to quickly and efficiently identify non-benign software applications (e.g., applications that are malicious, poorly written, incompatible with the device, etc.), and prevent such applications from degrading the a computing device's performance, power utilization levels, network usage levels, security, and/or privacy over time. The behavioral monitoring and analysis system may be configured to identify, prevent, and correct identified problems without having a significant, negative, or user perceivable impact on the responsiveness, performance, or power consumption characteristics of the computing device.

The behavior-based monitoring and analysis system may include an observer process, daemon, module, or sub-system (herein collectively referred to as a "module") a behavior extractor module, and an analyzer module. The observer module may be configured to instrument or coordinate various application programming interfaces (APIs), registers, counters, or other device components (herein collectively "instrumented components") at various levels of the computing device system, collect behavior information from the instrumented components, and communicate (e.g., via a memory write operation, function call, etc.) the collected behavior information to the behavior extractor module. The behavior extractor module may use the collected behavior information to generate behavior vectors that each represent or characterize many or all of the observed events, conditions, tasks, activities, and/or behaviors (herein collectively "behaviors") associated with one or more specific threads, processes, software applications, modules, or components of the device. The behavior extractor module may communicate (e.g., via a memory write operation, function call, etc.) the generated behavior vectors to the analyzer module, which may apply the behavior vectors to classifier models to generate analysis results, and use the analysis results to determine whether a software application or device behavior is benign or non-benign (e.g., malicious, poorly written, performance-degrading, etc.). The device processor may then perform various operations to correct, heal, cure, isolate, or otherwise fix the identified problems (e.g., behaviors determined to be non-benign).

Each behavior vector may be an information structure that includes or encapsulates one or more "behavior features." A behavior feature may be an abstract number or symbol that represents all or a portion of an observed event, condition, activity, operation, relationship, interaction, or behavior in the mobile device. Each behavior feature may be associated with a data type that identifies a range of possible values, operations that may be performed on those values, the meanings of the values, and other similar information. The data type may be used by the mobile device to determine how the corresponding behavior feature (or feature value) should be measured, analyzed, weighted, or used.

A classifier model may be a behavior model that includes data, entries, decision nodes, decision criteria, and/or information structures that may be used by a device processor to quickly and efficiently test or evaluate specific features, factors, data points, entries, APIs, states, conditions, behaviors, software applications, processes, operations, components, etc. (herein collectively "features") or other aspects of the device's behavior. A classifier model may also include information that may be used by a device processor to determine the nature of the relationships between software applications and/or the behaviors that to be monitored in the mobile device.

Each classifier model may be categorized as a full classifier model or a lean classifier model. A full classifier model may be a robust data model that is generated as a function of a large training dataset, which may include thousands of features and billions of entries. A lean classifier model may be a more focused data model that is generated from a reduced dataset that includes or prioritizes tests on the features/entries that are most relevant for determining whether a particular mobile device behavior is not benign. A local classifier model may be a lean classifier model that is generated in the mobile computing device. By generating classifier models in the computing device in which the models are used, the various aspects allow the computing device to accurately identify the specific features that are most important in determining whether a behavior on that specific device is benign or contributing to that device degradation in performance. These aspects also allow the computing device to accurately prioritize the features in the classifier models in accordance with their relative importance to classifying behaviors in that specific device.

To further reduce the number of features or factors that are monitored or analyzed in the computing device, the computing device processor may be configured to generate and use user-specific classifier models to determine whether a device behavior is non-benign. A user-specific classifier model may be a local classifier model that includes a highly focused data model that includes or prioritizes decision nodes that test or evaluate device features/entries that are most relevant for determining whether a device behavior is consistent with the ordinary usage of the computing device by a specific user. A user-specific classifier model also include or prioritize decision nodes that test/evaluate conditions related to a specific user and that user's persona, such as decision nodes for characterizing a user of the device, determining one or more personas for the user, or for determining whether a device behavior is consistent with a characterization or persona of the user. The device processor may be configured to generate a user-specific classifier model based on user-persona information that is collected, computed, or generated in the computing device.

Modern computing devices have unprecedented levels of access to information that is generated by, or which relates to, their users. For example, mobile computing devices are often equipped with sensors (e.g., accelerometer, gyroscope, geo-spatial positioning sensor, camera, heart rate monitor, glucometer, etc.) that collect or generate detailed personal information about the user. In addition, mobile computing devices now include powerful processors that allow for executing complex software applications, including applications for navigating the web, purchasing goods, monitor the user's health, controlling home appliances, playing games, watching/recording videos, navigating new cities, tracking workouts, conducting financial transactions, etc. These software applications often collect or generate detailed personal information about the user. The information that is collected, generated, or used by these software applications and sensors may be used by an aspect computing device to generate user-persona information that characterizes the activities, preferences, age, occupation, habits, moods, emotional states, personality, etc. of the user.

In addition, each person generally interacts with his/her computing device in a unique or distinct way. For example, mobile device users often have a distinct work or communication style, use specific software applications or specific types of software applications, use their mobile device to perform specific activities or accomplish specific tasks, perform activities in a specific order, perform specific activities at specific times, interact with specific software applications in a specific ways, etc. The distinct way in which a user interacts with his/her device may be learned over time, and used by an aspect computing device to generate user-persona information that identifies device usage patterns or distinct personality traits of the user.

Thus, the device processor may be configured to observe and/or collect user-persona information from the software applications operating in the computing device, the sensors of the computing, and/or from the user's interactions with the computing device or its software. The user-persona information may include any information that is suitable for identifying or characterizing the age, gender, personality, activities, device usage patterns, habits, moods, occupation, and/or emotional states of the device user. As examples, the user-persona information may include information identifying the user's interactions with the device, number and types of customizations performed on the device, types of software applications downloaded or used by a user, the rate at which the user touches or interacts with the screen, the device's graphics processing unit (GPU) usage level, how often the user uses the device to communicate with others, the user's preferred method of communication (e.g., text vs. voice), how fast the user communicates, the device memory size, etc.

The user-persona information may characterize the user as being "computer savvy" based on the number and type device customizations (e.g., number of to changes write/read settings, processor speeds, etc.) of the device. The user-persona information may characterize the user as being "male" or "female" based on the user's hand size, which may be determined based on the user's interactions with the device (e.g., user always uses one hand to interact with the device, which has a display size that is greater than 5.5 inches, etc.). The user-persona information may characterize the user as an "adult" or a "child" based on the types of software applications (e.g., productivity apps vs. games) downloaded or used by that user. The user-persona information may characterize the user is a "gamer" based on detecting a high touch screen rate, high GPU usage, and a medium communication level. The user-persona information may characterize user is a "photographer" based on the device including a high quality camera, a large memory, a robust photo gallery, a low touch screen rate, etc. The user-persona information may also characterize the user as belonging to a combination of the above-mentioned characterizations, such as "adult-female-gamer."

The device processor may use the user-persona information to generate the behavior vectors and/or the user-specific classifier models. For example, the device processor may be configured to use the user-persona information to dynamically determine the device features that are monitored, the behavior information that is included in the behavior vectors, the specific device features that are included in (and thus evaluated by) the classifier models, etc.

In an aspect, the device processor may be configured to use the user-persona information to dynamically determine the number of device features that are to be monitored or analyzed on the device so as to balance tradeoffs between accuracy and performance. For example, when the user persona information indicates that the user is older or less computer savvy, the device processor may increase the number of device features that are monitored/analyzed to increase the device's security. On the other hand, when the user persona information indicates that the user is a computer savvy gamer and that the computing device/platform is generally secure, the device processor may decrease the number of device features that are monitored/analyzed to improve performance.

In an aspect, the device processor may be configured to use the user-persona information to intelligently prioritize the features that are tested by the classifier models. For example, the device processor may prioritize the features that test conditions related to e-Commerce and credit card protection when the user persona information indicates that the user frequently shops online using his/her mobile computing device. As another example, when the user persona information indicates that the user is elderly or not computer savvy, the device processor may prioritize the features that test conditions related to detect spam and phishing attacks that target senior citizens.

The device processor may be configured to collect user-persona information by monitoring any of a variety of software applications (or software application types), including calendar applications, reminder applications, communication applications, financial applications, applications for accomplishing specific tasks (e.g., word processing, preparing tax reforms, presentation applications, accounting applications, etc.), location based applications (e.g., mapping and geolocation apps, etc.), social media applications, web browsers (e.g., to obtain information regarding past searches, browsing history, types of websites visited, content of websites visited, etc.), entertainment applications (e.g., an audio or multimedia player application), applications for accessing user accounts (e.g., banking apps, etc.), personal training and development applications, etc.

The computing device processor may use the user-persona information collected from monitoring software applications to learn, ascertain, or infer information about the user, such as the user's mood. For example, a large number of social media status updates may indicate that user is bored. The presence of an uncharacteristically large number of negative words in emails may indicate user is upset or angry. A significant increase in the user's bank account balance (or stock portfolio) may indicate that the user is more likely to be happy or in good mood, and a significant decrease (or a prolonged reduction) in the user's bank account may indicate that the user is likely to be upset or under elevated levels of stress. Any number of observable or accessible parameters, characteristics or data may be correlated to user moods and emotional states.

The device processor may be configured to determine the user's mood (e.g., bored, upset, angry, stressed, happy, positive, excited, etc.), correlate the user's mood with the other information collected from the device, use these correlations to learn the user's device usage patterns, and determine whether an identified/detected/monitored device behavior is consistent with the user's normal usage patterns. For example, the computing device may determine that, based on historical usage information, it is uncharacteristic for specific user to play games when he/she is sad. Therefore, the presence, execution, or use of a game application on the device when the user is determined to be sad is more indicative of a non-benign device behavior (i.e., there is higher probability that the game application is malware). As such, the device processor may update or reprioritize the device features that are monitored or analyzed to focus its operations on determining whether the game application is non-benign.

In some aspects, the device processor may be configured to intelligently identify the device behaviors (or the activities of software applications) for which the user-persona information (e.g., the user's mood) is relevant, and generate behavior vectors for the identified device behaviors so that they account for the user-persona information that is determined to be relevant. For example, in an aspect, the device processor may be configured to generate a behavior vector that includes a "mood" data field that stores a null value if the user-persona information determine to not be relevant, and which identifies the user's mood (e.g., angry) when the behavior was observed if the user-persona information is determined to be relevant.

The device processor may also be configured to generate the behavior vectors to include an independent data field for each of the user's detected moods (or each of the other characterizations of the user). The values of such data fields identify the number of times a software application performed an activity or activities that is/are not consistent with a specific characterization. For example, a behavior vector may include a "lazy" data field whose value identifies the number of times a software application accessed location-based information (e.g. GPS information) when the user was in a "lazy" or "tired" mood. This allows the computing device to aggregate information (e.g., frequency or rate) over time and/or to analyze the user's mood information independent of, and in parallel, with the observed behaviors of the mobile device.

In another aspect, the device processor may be configured to generate behavior vectors that include multiple correlated sub-vectors or information structures. For example, a first sub-vector/structure may include behavior information collected from monitoring the instrumented components, a second sub-vector/structure may identify whether a user characterization is relevant to that behavior/behavior information, and a third sub-vector/structure may include a value for the specific characterization (e.g., a value identifying the user's mood when the behavior information collected).

In addition, the device processor may be configured to generate and use classifier models that test conditions in relation to the user characterization (i.e., to the user-persona information). For example, the processor may generate a classifier model that evaluates conditions/features focused on identifying the presence, use, or execution of certain types of software applications (e.g., games, etc.) when the user is in a specific mood (e.g., sad, tired, angry, busy, stressed, etc.). Such a classifier model may include a decision tree that first tests the condition "is there low tempo music playing on the device," to determine whether the user is sad, and then tests the condition "are any of the active processes associated with a game app" in response to determining that the user is sad. Alternatively, the classifier model may include a single decision node (e.g., a decision stump, etc.) that tests a combination of conditions, such as "do the active processes include a process that is associated with an entertainment app and a process that is associated with a game app."

In an aspect, the device processor may be configured to monitor an activity or many activities of a software application (e.g., a user-interaction between the user and the software application) operating on the computing device to generate user-persona information that characterizes a user of the computing device, and use the user-persona information to determine whether the device behavior is non-benign. The device processor may be configured to use the generated user-persona information to identify device features that are most relevant to determining whether the device behavior is not consistent with a pattern of ordinary usage of the computing device by the user, monitor the identified device features to collect behavior information, generate a behavior vector that characterizes the collected behavior information, and apply the generated behavior vector to a user-specific classifier model to determine whether the device behavior is non-benign.

In an aspect, the device processor may be configured to determine whether the user-persona information (e.g., information characterizing the user's personality, mood, habits, etc.) is relevant to analyzing all or portions of the collected behavior information, generate a classifier model that includes a decision node that evaluates a device feature in relation to the user's mood (if relevant), generate a behavior vector that correlates the collected behavior information for which the user's mood is relevant to the user's mood at the time the behavior information was collected, and apply the generated behavior vector to the generated classifier model to determine whether a device behavior is non-benign.

The device processor may also be configured to receive/retrieve a full classifier model that includes a plurality of test conditions, identify test conditions in the plurality of test conditions that evaluate the identified device features, generate a user-classifier model classifier model that includes and/or prioritizes the identified test conditions, apply a behavior vector to the classifier model so as to evaluate each test condition included in the classifier model, compute a weighted average of each result of evaluating test conditions in the classifier model, and determine whether the device behavior is non-benign based on the computed weighted average.

The various aspects (including the aspects described with reference to FIGS. 2-7), may be implemented in a number of different mobile devices, including single processor and multiprocessor systems, and a system-on-chip (SOC). FIG. 1 is an architectural diagram illustrating an example system-on-chip (SOC) 100 architecture that may be used in computing devices implementing the various aspects. The SOC 100 may include a number of heterogeneous processors, such as a digital signal processor (DSP) 101, a modem processor 104, a graphics processor 106, and an application processor 108. The SOC 100 may also include one or more coprocessors 110 (e.g., vector co-processor) connected to one or more of the heterogeneous processors 102, 104, 106, 108. Each processor 101, 104, 106, 108, 110 may include one or more cores, and each processor/core may perform operations independent of the other processors/cores. For example, the SOC 100 may include a processor that executes a first type of operating system (e.g., FreeBSD, LINIX, OS X, etc.) and a processor that executes a second type of operating system (e.g., Microsoft Windows 8).

The SOC 100 may also include analog circuitry and custom circuitry 114 for managing sensor data, analog-to-digital conversions, wireless data transmissions, and for performing other specialized operations, such as processing encoded audio signals for games and movies. The SOC 100 may further include system components and resources 116, such as voltage regulators, oscillators, phase-locked loops, peripheral bridges, data controllers, memory controllers, system controllers, access ports, timers, and other similar components used to support the processors and clients running on a computing device.

The system components 116 and custom circuitry 114 may include circuitry to interface with peripheral devices, such as cameras, electronic displays, wireless communication devices, external memory chips, etc. The processors 101, 104, 106, 108 may be interconnected to one or more memory elements 112, system components, and resources 116 and custom circuitry 114 via an interconnection/bus module 124, which may include an array of reconfigurable logic gates and/or implement a bus architecture (e.g., CoreConnect, AMBA, etc.). Communications may be provided by advanced interconnects, such as high performance networks-on chip (NoCs).

The SOC 100 may further include an input/output module (not illustrated) for communicating with resources external to the SOC, such as a clock 118 and a voltage regulator 120. Resources external to the SOC (e.g., clock 118, voltage regulator 120) may be shared by two or more of the internal SOC processors/cores (e.g., DSP 101, modem processor 104, graphics processor 106, applications processor 108, etc.).

The SOC 100 may also include hardware and/or software components suitable for collecting sensor data from sensors, including speakers, user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth®, WLAN, WiFi, etc.), and other well known components (e.g., accelerometer, etc.) of modern electronic devices.

In addition to the SOC 100 discussed above, the various aspects may be implemented in a wide variety of computing systems, which may include a single processor, multiple processors, multicore processors, or any combination thereof.

Figure 2:
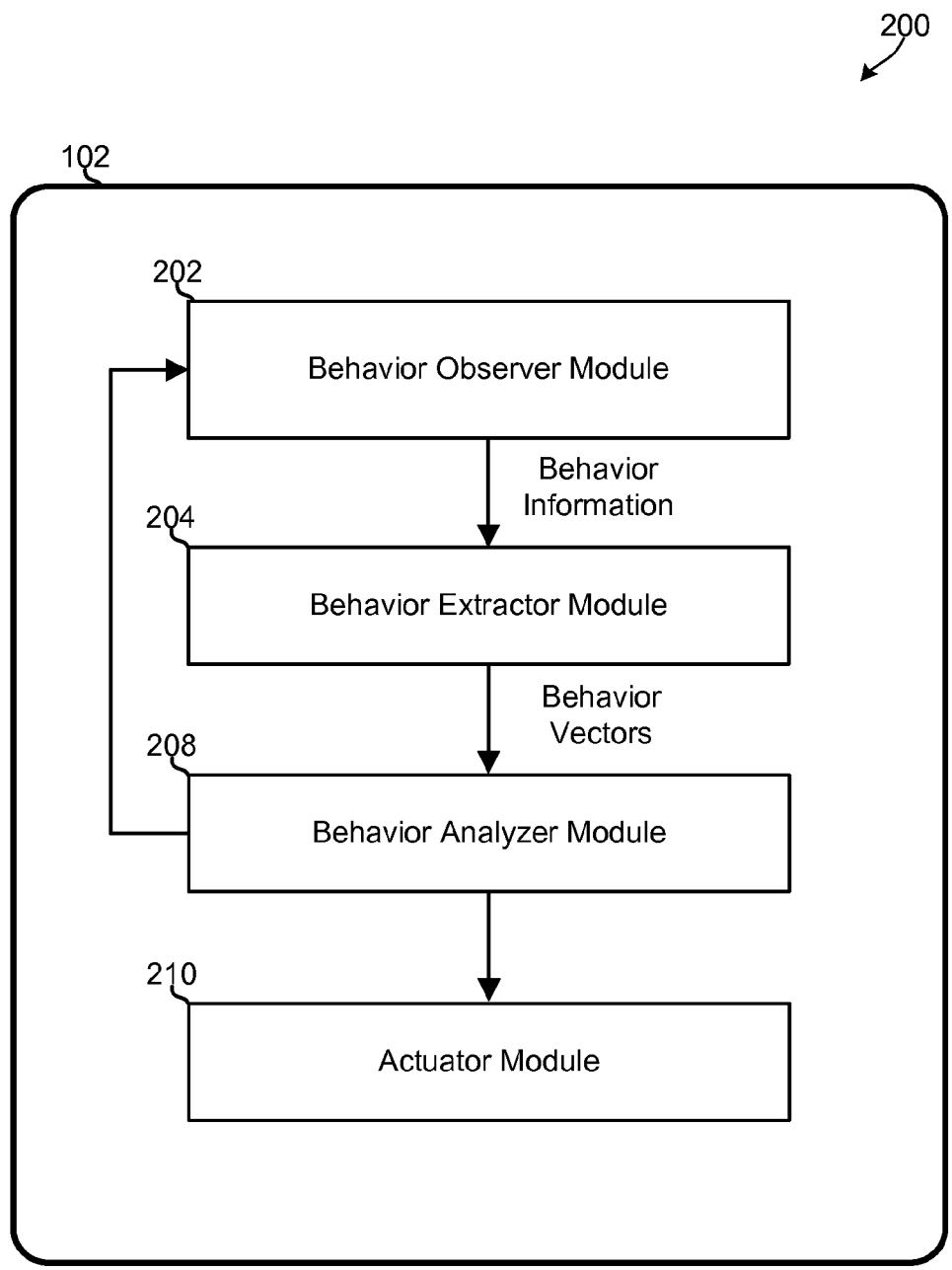
FIG. 2 is a block diagram illustrating example logical components and information flows in an aspect mobile device configured to determine whether a particular mobile device behavior is benign or non-benign.

FIG. 2 illustrates example logical components and information flows in an aspect computing device that includes a behavior-based security system 200 configured to use behavioral analysis techniques to identify and respond to non-benign device behaviors. In the example illustrated in FIG. 2, the computing device is a mobile device 102 that includes a device processor (i.e., mobile device processor) configured with executable instruction modules that include a behavior observer module 202, a behavior extractor module 204, a behavior analyzer module 206, and an actuator module 208. Each of the modules 202-208 may be a thread, process, daemon, module, sub-system, or component that is implemented in software, hardware, or a combination thereof. In various aspects, the modules 202-208 may be implemented within parts of the operating system (e.g., within the kernel, in the kernel space, in the user space, etc.), within separate programs or applications, in specialized hardware buffers or processors, or any combination thereof. In an aspect, one or more of the modules 202-208 may be implemented as software instructions executing on one or more processors of the mobile device 102.

The behavior observer module 202 may be configured to instrument application programming interfaces (APIs), counters, hardware monitors, etc. at various levels/modules of the device, and monitor the activities, conditions, operations, and events (e.g., system events, state changes, etc.) at the various levels/modules over a period of time. The behavior observer module 202 may collect behavior information pertaining to the monitored activities, conditions, operations, or events, and store the collected information in a memory (e.g., in a log file, etc.).

In addition, the behavior observer module 202 may be configured to monitor the activities of the mobile computing device 102, user interactions with the device, and other information that is available to the device (e.g., via sensors of the device) to collect user-persona information.

The behavior observer module 202 may collect user-persona information by monitoring select software applications or certain types of software applications operating in the device. Such applications include calendar and reminder applications, financial applications, applications for accomplishing specific tasks (e.g., word processing, preparing tax reforms, presentation applications, accounting applications, etc.), location based applications (e.g., mapping and geolocation apps, etc.), web browsers (e.g., past searches, browsing history, types of websites visited, content of websites visited, etc.), entertainment applications (e.g., an audio or multimedia player application), applications for accessing user accounts (e.g., banking apps, etc.), personal training and development applications, etc. The device processor may use such user-persona information to ascertain or infer information about the user, such as the user's mood. For example, a large number of social media status updates may indicate that user is bored. As further example, the presence of an uncharacteristically large number of negative words in emails may indicate user is upset or angry, a significant increase in the user's bank account balance (or stock portfolio) may indicate that the user is more likely to be in good mood, and a significant decrease (or a prolonged reduction) in the user's bank account may indicate that the user is likely to be upset or under elevated levels of stress.

The behavior observer module 202 may also collect user-persona information by monitoring geo-spatial positioning and navigation systems of the device to determine user's current location (e.g., at the office, at home, at a restaurant, a gym, traveling, etc.), the user's current movements (e.g., is currently traveling, is exercising, is stationary, etc.), history of movements (e.g., travels extensively, never leaves town, etc.), whether the user is following his/her established routine (e.g., arrived to work on time, still at work) or is off his/her routine (e.g., arrived later than usual, left earlier than usual). The device processor may use this information, alone or in conjunction with other collected information, to determine the user's schedule, mood, habits, emotional state, etc. For example, the user may be more likely to be in a pleasant mood if he/she is at home, or more likely to be annoyed if receiving a phone call while at a restaurant.

The behavior observer module 202 may also collect user-persona information by obtaining data from a heart rate monitor, blood pressure monitor, thermometer, pedometer, blood glucose meter, humidity sensor, breathalyzer, galvanic skin response sensor, or other sensor or monitor device within or communicating with the computing device. The device processor may use this information to ascertain or infer information about the user. For example, information obtained from a heart rate monitor, blood glucose meter and/or blood pressure monitor may be used to determine if the user is exercising (and therefore occupied), experiencing a medical condition, under stress, in a bad mood, etc. High humidity information obtained from a humidity sensor may indicate that the user is likely to be irritated. Information obtained from a breathalyzer may be used to infer that the user has been drinking alcohol, which may be used in conjunction with other user-persona information to determine the user's emotional state or mood.

The behavior observer module 202 may also collect user-persona information by monitoring a media-player of the device. The device processor may use this information to determine the user's mood, habits, emotional state, etc. For example, if the user is listening to positive or upbeat music, it may indicate that he/she is more likely to be in a good mood. On the other hand, if the user's listening history indicates that the user has been recently listening to uncharacteristically sad or low tempo music, this may indicate that the user is sad. As another example, if the user is watching a movie, it may indicate that he is either available or busy (depending on the content of the movie, the user's viewing history, the user's personality, etc.).

In addition, the behavior observer module 202 may be configured to monitor the activities of the mobile computing device 102 by collecting information pertaining to library application programming interface (API) calls in an application framework or run-time libraries, system call APIs, file-system and networking sub-system operations, device (including sensor devices) state changes, and other similar events. In addition, the behavior observer module 202 may monitor file system activity, which may include searching for filenames, categories of file accesses (personal info or normal data files), creating or deleting files (e.g., type exe, zip, etc.), file read/write/seek operations, changing file permissions, etc.

The behavior observer module 202 may also monitor the activities of the mobile computing device 102 by monitoring data network activity, which may include types of connections, protocols, port numbers, server/client that the device is connected to, the number of connections, volume or frequency of communications, etc. The behavior observer module 202 may monitor phone network activity, which may include monitoring the type and number of calls or messages (e.g., SMS, etc.) sent out, received, or intercepted (e.g., the number of premium calls placed).

The behavior observer module 202 may also monitor the activities of the mobile computing device 102 by monitoring the system resource usage, which may include monitoring the number of forks, memory access operations, number of files open, etc. The behavior observer module 202 may monitor the state of the mobile computing device 102, which may include monitoring various factors, such as whether the display is on or off, whether the device is locked or unlocked, the amount of battery remaining, the state of the camera, etc. The behavior observer module 202 may also monitor inter-process communications (IPC) by, for example, monitoring intents to crucial services (browser, contracts provider, etc.), the degree of inter-process communications, pop-up windows, etc.

The behavior observer module 202 may also monitor the activities of the mobile computing device 102 by monitoring driver statistics and/or the status of one or more hardware components, which may include cameras, sensors, electronic displays, WiFi communication components, data controllers, memory controllers, system controllers, access ports, timers, peripheral devices, wireless communication components, external memory chips, voltage regulators, oscillators, phase-locked loops, peripheral bridges, and other similar components used to support the processors and clients running on the mobile computing device 102.

The behavior observer module 202 may also monitor the activities of the mobile computing device 102 by monitoring one or more hardware counters that denote the state or status of the mobile computing device 102 and/or computing device sub-systems. A hardware counter may include a special-purpose register of the processors/cores that is configured to store a count value or state of hardware-related activities or events occurring in the mobile computing device 102.

The behavior observer module 202 may also monitor the activities of the mobile computing device 102 by monitoring the actions or operations of software applications, software downloads from an application download server (e.g., Apple® App Store server), computing device information used by software applications, call information, text messaging information (e.g., SendSMS, BlockSMS, ReadSMS, etc.), media messaging information (e.g., ReceiveMMS), user account information, location information, camera information, accelerometer information, browser information, content of browser-based communications, content of voice-based communications, short range radio communications (e.g., Bluetooth, WiFi, etc.), content of text-based communications, content of recorded audio files, phonebook or contact information, contacts lists, etc.

The behavior observer module 202 may also monitor the activities of the mobile computing device 102 by monitoring transmissions or communications of the mobile computing device 102, including communications that include voicemail (VoiceMailComm), device identifiers (DeviceIDComm), user account information (UserAccountComm), calendar information (CalendarComm), location information (LocationComm), recorded audio information (RecordAudioComm), accelerometer information (AccelerometerComm), etc.

The behavior observer module 202 may also monitor the activities of the mobile computing device 102 by monitoring the usage of, and updates/changes to, compass information, computing device settings, battery life, gyroscope information, pressure sensors, magnet sensors, screen activity, etc. The behavior observer module 202 may monitor notifications communicated to and from a software application (AppNotifications), application updates, etc. The behavior observer module 202 may monitor conditions or events pertaining to a first software application requesting the downloading and/or install of a second software application. The behavior observer module 202 may monitor conditions or events pertaining to user verification, such as the entry of a password, etc.

The behavior observer module 202 may also monitor the activities of the mobile computing device 102 by monitoring conditions or events at multiple levels of the mobile computing device 102, including the application level, radio level, and sensor level. Application level observations may include observing the user via facial recognition software, observing social streams, observing notes entered by the user, observing events pertaining to the use of PassBook®, Google® Wallet, Paypal®, and other similar applications or services. Application level observations may also include observing events relating to the use of virtual private networks (VPNs) and events pertaining to synchronization, voice searches, voice control (e.g., lock/unlock a phone by saying one word), language translators, the offloading of data for computations, video streaming, camera usage without user activity, microphone usage without user activity, etc.

Radio level observations may include determining the presence, existence or amount of any or more of user interaction with the mobile computing device 102 before establishing radio communication links or transmitting information, dual/multiple subscriber identification module (SIM) cards, Internet radio, mobile phone tethering, offloading data for computations, device state communications, the use as a game controller or home controller, vehicle communications, computing device synchronization, etc. Radio level observations may also include monitoring the use of radios (WiFi, WiMax, Bluetooth, etc.) for positioning, peer-to-peer (p2p) communications, synchronization, vehicle to vehicle communications, and/or machine-to-machine (m2m). Radio level observations may further include monitoring network traffic usage, statistics, or profiles.

Sensor level observations may include monitoring a magnet sensor or other sensor to determine the usage and/or external environment of the mobile computing device 102. For example, the computing device processor may be configured to determine whether the device is in a holster (e.g., via a magnet sensor configured to sense a magnet within the holster) or in the user's pocket (e.g., via the amount of light detected by a camera or light sensor). Detecting that the mobile computing device 102 is in a holster may be relevant to recognizing suspicious behaviors, for example, because activities and functions related to active usage by a user (e.g., taking photographs or videos, sending messages, conducting a voice call, recording sounds, etc.) occurring while the mobile computing device 102 is holstered could be signs of nefarious processes executing on the device (e.g., to track or spy on the user).

Other examples of sensor level observations related to usage or external environments may include, detecting near-field communication (NFC) signaling, collecting information from a credit card scanner, barcode scanner, or mobile tag reader, detecting the presence of a Universal Serial Bus (USB) power charging source, detecting that a keyboard or auxiliary device has been coupled to the mobile computing device 102, detecting that the mobile computing device 102 has been coupled to another computing device (e.g., via USB, etc.), determining whether an LED, flash, flashlight, or light source has been modified or disabled (e.g., maliciously disabling an emergency signaling app, etc.), detecting that a speaker or microphone has been turned on or powered, detecting a charging or power event, detecting that the mobile computing device 102 is being used as a game controller, etc. Sensor level observations may also include collecting information from medical or healthcare sensors or from scanning the user's body, collecting information from an external sensor plugged into the USB/audio jack, collecting information from a tactile or haptic sensor (e.g., via a vibrator interface, etc.), collecting information pertaining to the thermal state of the mobile computing device 102, etc.

To reduce the number of factors monitored to a manageable level, in an aspect, the behavior observer module 202 may be configured to perform coarse observations by monitoring/observing an initial set of behaviors or factors that are a small subset of all factors that could contribute to the computing device's degradation. In an aspect, the behavior observer module 202 may receive the initial set of behaviors and/or factors from a server and/or a component in a cloud service or network. In an aspect, the initial set of behaviors/factors may be specified in machine learning classifier models.

The behavior observer module 202 may communicate (e.g., via a memory write operation, function call, etc.) the collected behavior information to the behavior extractor module 204. The behavior extractor module 204 may be configured to receive or retrieve the collected behavior information, and use this information to generate one or more behavior vectors. Each behavior vector may succinctly describe the behavior of the device, software application, or process in a value or vector data-structure. The vector data-structure may include series of numbers, each of which signifies a feature or a behavior of the mobile device, such as whether a camera of the mobile device is in use (e.g., as zero or one), how much network traffic has been transmitted from or generated by the mobile device (e.g., 20 KB/sec, etc.), how many Internet messages have been communicated (e.g., number of SMS messages, etc.), and/or any other behavior information collected by the behavior observer module 202. In an aspect, the behavior extractor module 204 may be configured to generate the behavior vectors so that they function as an identifier that enables the mobile device system (e.g., the behavior analyzer module 206) to quickly recognize, identify, or analyze a behavior of the device.

In an aspect, the behavior extractor module 204 may be configured to generate the behavior vectors to include information that may be input to a feature/decision node in the machine learning classifier to generate an answer to a query regarding a monitored activity or activities.

In an aspect, the behavior extractor module 204 may be configured to generate the behavior vectors to include execution information. The execution information may be included in the behavior vector as part of a behavior (e.g., camera used five times in three second by a background process, camera used three times in three second by a foreground process, etc.) or as part of an independent feature. In an aspect, the execution state information may be included in the behavior vector as a shadow feature value sub-vector or data structure. In an aspect, the behavior vector may store the shadow feature value sub-vector/data structure in association with the features, activities, tasks for which the execution state is relevant.

The behavior extractor module 204 may communicate (e.g., via a memory write operation, function call, etc.) the generated behavior vectors to the behavior analyzer module 206. The behavior analyzer module 206 may be configured to apply the behavior vectors to classifier modules to determine whether a device behavior is a non-benign behavior that is contributing to (or is likely to contribute to) the device's degradation over time and/or which may otherwise cause problems on the device.

Each classifier model may be a behavior model that includes data and/or information structures (e.g., feature vectors, behavior vectors, component lists, etc.) that may be used by a computing device processor to evaluate a specific feature or aspect of a computing device's behavior. Each classifier model may also include decision criteria for monitoring a number of features, factors, data points, entries, APIs, states, conditions, behaviors, applications, processes, operations, components, etc. (herein collectively "features") in the computing device. The classifier models may be preinstalled on the computing device, downloaded or received from a network server, generated in the computing device, or any combination thereof. The classifier models may be generated by using crowd sourcing solutions, behavior modeling techniques, machine learning algorithms, etc.

Each classifier model may be categorized as a full classifier model or a lean classifier model. A full classifier model may be a robust data model that is generated as a function of a large training dataset, which may include thousands of features and billions of entries. A lean classifier model may be a more focused data model that is generated from a reduced dataset that includes/tests only the features/entries that are most relevant for determining whether a particular activity is an ongoing critical activity and/or whether a particular computing device behavior is not benign. As an example, a device processor may be may be configured to receive a full classifier model from a network server, generate a lean classifier model in the mobile device based on the full classifier, and use the locally generated lean classifier model to classify a behavior of the device as being either benign or non-benign (i.e., malicious, performance degrading, etc.).

A locally generated lean classifier model is a lean classifier model that is generated in the computing device. That is, since mobile devices are highly configurable and complex systems, the features that are most important for determining whether a particular device behavior is non-benign (e.g., malicious or performance-degrading) may be different in each device. Further, a different combination of features may require monitoring and/or analysis in each device in order for that device to quickly and efficiently determine whether a particular behavior is non-benign. Yet, the precise combination of features that require monitoring and analysis, and the relative priority or importance of each feature or feature combination, can often only be determined using information obtained from the specific device in which the behavior is to be monitored or analyzed. For these and other reasons, various aspects may generate classifier models in the mobile device in which the models are used. These local classifier models allow the device processor to accurately identify the specific features that are most important in determining whether a behavior on that specific device is non-benign (e.g., contributing to that device's degradation in performance). The local classifier models also allow the device processor to prioritize the features that are tested or evaluated in accordance with their relative importance to classifying a behavior in that specific device.

A device-specific classifier model is a classifier model that includes a focused data model that includes/tests only computing device-specific features/entries that are determined to be most relevant to classifying an activity or behavior in a specific computing device.

An application-specific classifier model is a classifier model that includes a focused data model that includes/tests only the features/entries that are most relevant for evaluating a particular software application.

A user-specific classifier model may be a local classifier model that includes a focused data model that includes or prioritizes tests on the features/entries that are most relevant for identifying a user of the device, determining the persona of the user, determining whether a device behavior is consistent with the persona of an identified user, determining whether a device behavior is consistent with the ordinary usage of that device by one of its identified users, or for determining whether a user's activities are indicative of a non-benign device behavior.

By dynamically generating user-specific, device-specific, and/or application-specific classifier models locally in the mobile device, the various aspects allow the device processor to focus its monitoring and analysis operations on a small number of features that are most important for determining whether the operations of that specific mobile device and/or of a specific software application operating in that device are consistent with the personality, habits, or ordinary usage patterns of a known user of that specific device.

In an aspect, the behavior analyzer module 206 may be configured to classify a behavior as "suspicious" when the results of its behavioral analysis operations do not provide sufficient information to classify a device behavior as either benign or non-benign. The behavior analyzer module 206 may be configured to notify the behavior observer module 202 in response to determining that a device behavior is suspicious. In response, the behavior observer module 202 may adjust the granularity of its observations (i.e., the level of detail at which computing device features are monitored) and/or change the factors or behaviors that are monitored based on information received from the behavior analyzer module 206 (e.g., results of the real-time analysis operations), generate or collect new or additional behavior information, and send the new/additional information to the behavior analyzer module 206 for further analysis/classification. Such feedback communications between the behavior observer module 202 and the behavior analyzer module 206 enable the mobile computing device 102 to recursively increase the granularity of the observations (i.e., make finer or more detailed observations) or change the features/behaviors that are observed until a collective behavior is classified as benign or non-benign, a source of a suspicious or performance-degrading behavior is identified, until a processing or battery consumption threshold is reached, or until the device processor determines that the source of the suspicious or performance-degrading device behavior cannot be identified from further changes, adjustments, or increases in observation granularity. Such feedback communication also enable the mobile computing device 102 to adjust or modify the behavior vectors and classifier models without consuming an excessive amount of the computing device's processing, memory, or energy resources.

In an aspect, the behavior analyzer module 206 may be configured to receive and analyze information collected by various mobile device sub-systems and/or over various time periods to learn the normal operational behaviors of the mobile device under a variety of contexts and conditions, and generate models of normal mobile device behaviors under the various contexts/conditions. In an aspect, the analyzer module 204 may be configured to correlate the collected behavior information against the generated behavior models, and perform behavior analysis operations based on the correlations to determine whether the received observations conflict with (or do not match) the learned normal operational behaviors.

As a high-level example, the mobile device 102 might detect (via the collected behavior information) that a camera has been used, that the mobile device 102 is attempting to upload the picture to a server, and that an application on the mobile device took the picture while the device was holstered and attached to the user's belt. The mobile device 102 may determine whether this detected behavior (e.g., usage of the camera while holstered) is a behavior that is acceptable or common to the user. This may be achieved by comparing the detected behavior (e.g., the generated behavior vector) with past behaviors of the mobile device 102 or user. Since taking pictures and uploading them to a server while holstered is an unusual behavior (as may be determined from observed normal behaviors in the context of being holstered), in this situation the computing device may recognize this as being inconsistent with a pattern of ordinary usage of the computing device by the user, and initiate an appropriate response (e.g., shutting off the camera, sounding an alarm, etc.).

In the various aspects, the mobile device 102 may be configured to work in conjunction with a network server to intelligently and efficiently identify the features, factors, and data points that are most relevant to determining whether an activity or behavior is non-benign. For example, the device processor may be configured to receive a full classifier model from the network server, and use the received full classifier model to generate lean classifier models (i.e., data/behavior models) that are specific for the users of the device and/or to the features and functionalities of the device or its software applications. The device processor may use the full classifier model to generate a family of lean classifier models of varying levels of complexity (or "leanness"). The leanest family of lean classifier models (i.e., the lean classifier model based on the fewest number of test conditions) may be applied routinely until a behavior is encountered that the classifier model cannot categorize as either benign or not benign (and therefore is categorized by the model as suspicious), at which time a more robust (i.e., less lean) lean classifier model may be applied in an attempt to categorize the behavior. The application of ever more robust lean classifier models within the family of generated lean classifier models may be applied until a definitive classification of the behavior is achieved. In this manner, the device processor can strike a balance between efficiency and accuracy by limiting the use of the most complete, but resource-intensive lean classifier models to those situations where a robust classifier model is needed to definitively classify a behavior.

In various aspects, the device processor may be configured to generate lean classifier models by converting a finite state machine representation or expression included in a full classifier model into boosted decision stumps. The device processor may prune or cull the full set of boosted decision stumps based on the user-persona information or user-specific device features to generate a lean classifier model that includes a subset of boosted decision stumps included in the full classifier model. The device processor may then use the lean classifier model to intelligently monitor, analyze and/or classify a device behavior.

Boosted decision stumps are one level decision trees that have exactly one node (and thus one test question or test condition) and a weight value, and thus are well suited for use in a binary classification of data/behaviors. That is, applying a behavior vector to boosted decision stump results in a binary answer (e.g., Yes or No). For example, if the question/condition tested by a boosted decision stump is "is the frequency of Short Message Service (SMS) transmissions less than x per minute," applying a value of "3" to the boosted decision stump will result in either a "yes" answer (for "less than 3" SMS transmissions) or a "no" answer (for "3 or more" SMS transmissions). Boosted decision stumps are efficient because they are very simple and primal (and thus do not require significant processing resources). Boosted decision stumps are also very parallelizable, and thus many stumps may be applied or tested in parallel/at the same time (e.g., by multiple cores or processors in the computing device).

Figure 3:
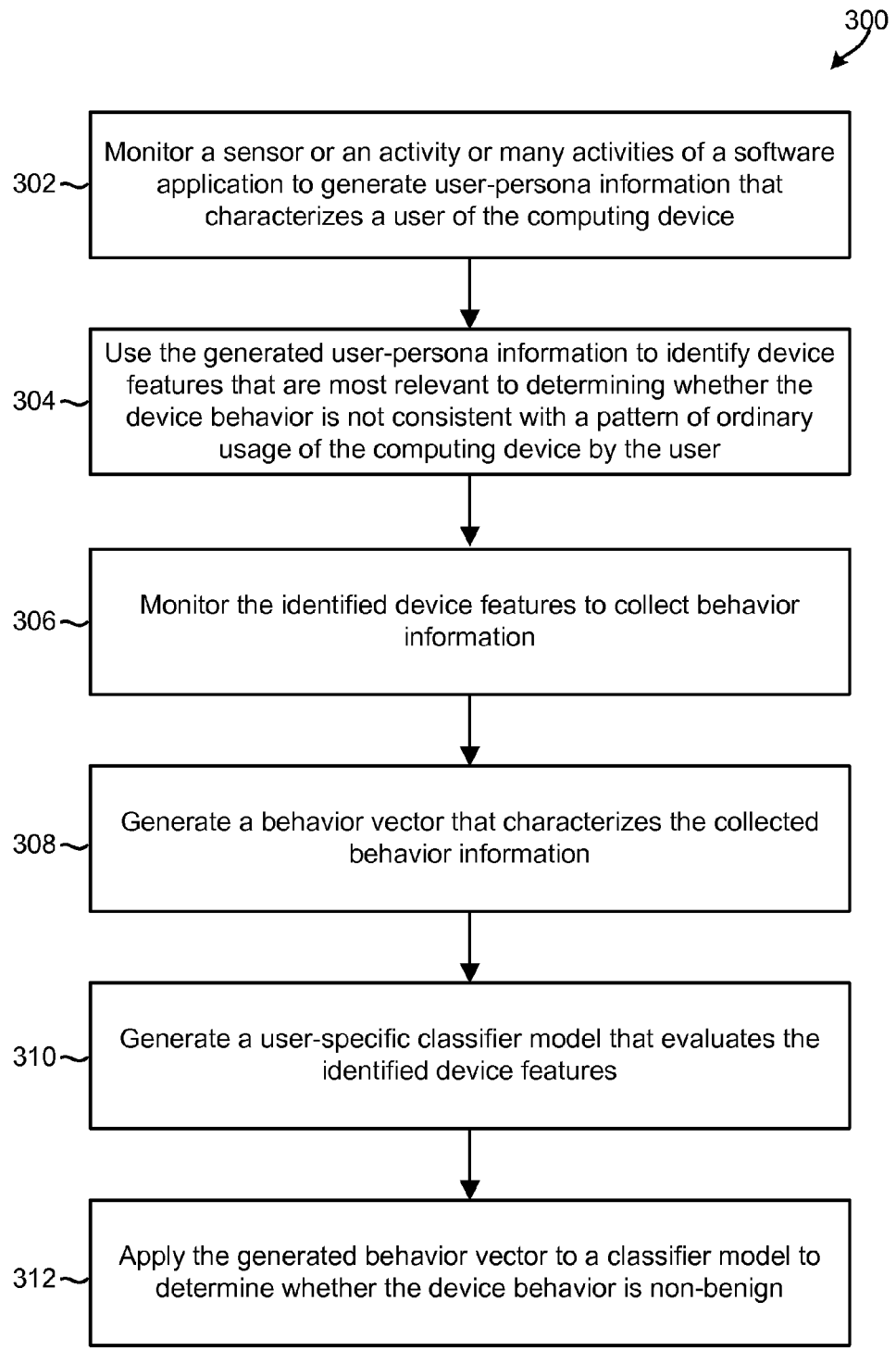
FIG. 3 is a process flow diagram illustrating a method of analyzing a device behavior based on user persona information in accordance with an aspect.

FIG. 3 illustrates a method 300 of generating and using user-persona information to determine whether a device behavior is non-benign in accordance with an aspect. Method 300 may be performed by a device processor or device processor in a mobile or resource constrained computing device. In block 302, the device processor may monitor a sensor, an activity, or a number of activities of a software application to generate user-persona information that characterizes a user of the computing device. In an aspect, this may be accomplished via the behavior observer module 202 discussed above.

In block 304, the device processor may use the generated user-persona information to identify device features that are most relevant to determining whether the device behavior is not consistent with a pattern of ordinary usage of the computing device by the user. In block 306, the device processor may monitor the identified device features to collect behavior information. In block 308, the device processor may generate a behavior vector that characterizes the collected behavior information. In block 310, the device processor may generate a user-specific classifier model that evaluates the identified device features. In block 312, the device processor may apply the generated behavior vector to a classifier model to determine whether the device behavior is non-benign.

Figure 4:
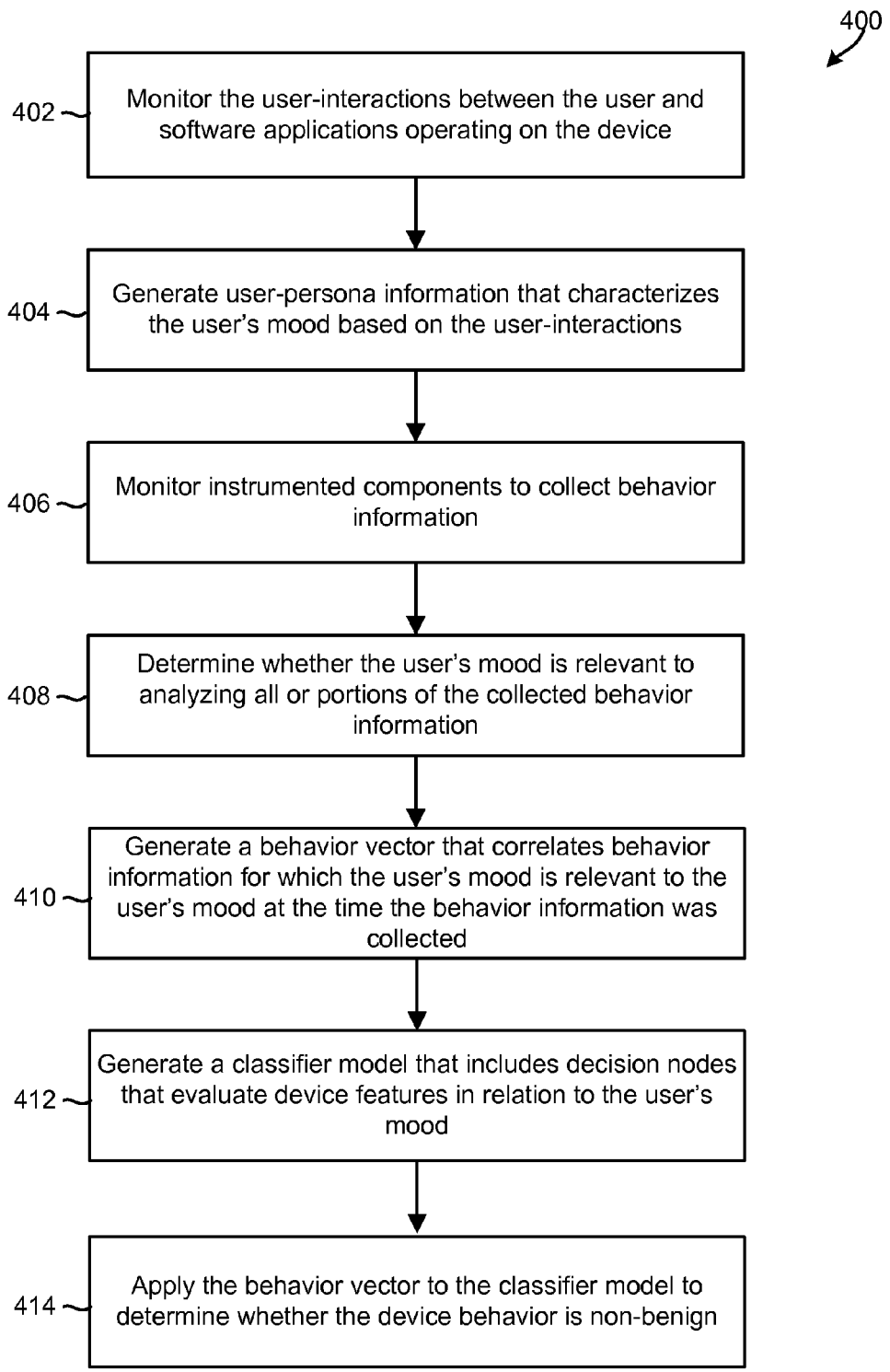
FIG. 4 is a process flow diagram illustrating a method of analyzing a device behavior based on user persona information in accordance with another aspect.

FIG. 4 illustrates another method 400 of generating and using user-persona information to determine whether a device behavior is non-benign in accordance with an aspect. Method 400 may be performed by a device processor of a mobile or resource constrained computing device.

In block 402, the device processor may monitor the user-interactions between the user and software applications operating on the device. In block 404, the device processor may generate user-persona information that characterizes the user's mood based on the user-interactions. In block 406, the device processor may monitor instrumented components to collect behavior information. In block 408, the device processor may determine whether the user's mood is relevant to analyzing all or portions of the collected behavior information. In block 410, the device processor may generate a behavior vector that correlates behavior information for which the user's mood is relevant to the user's mood at the time the behavior information was collected. In block 412, the device processor may generate a classifier model that includes decision nodes that evaluate device features in relation to the user's mood. In block 414, the device processor may apply the behavior vector to the classifier model to determine whether the device behavior is non-benign.

Figure 5:
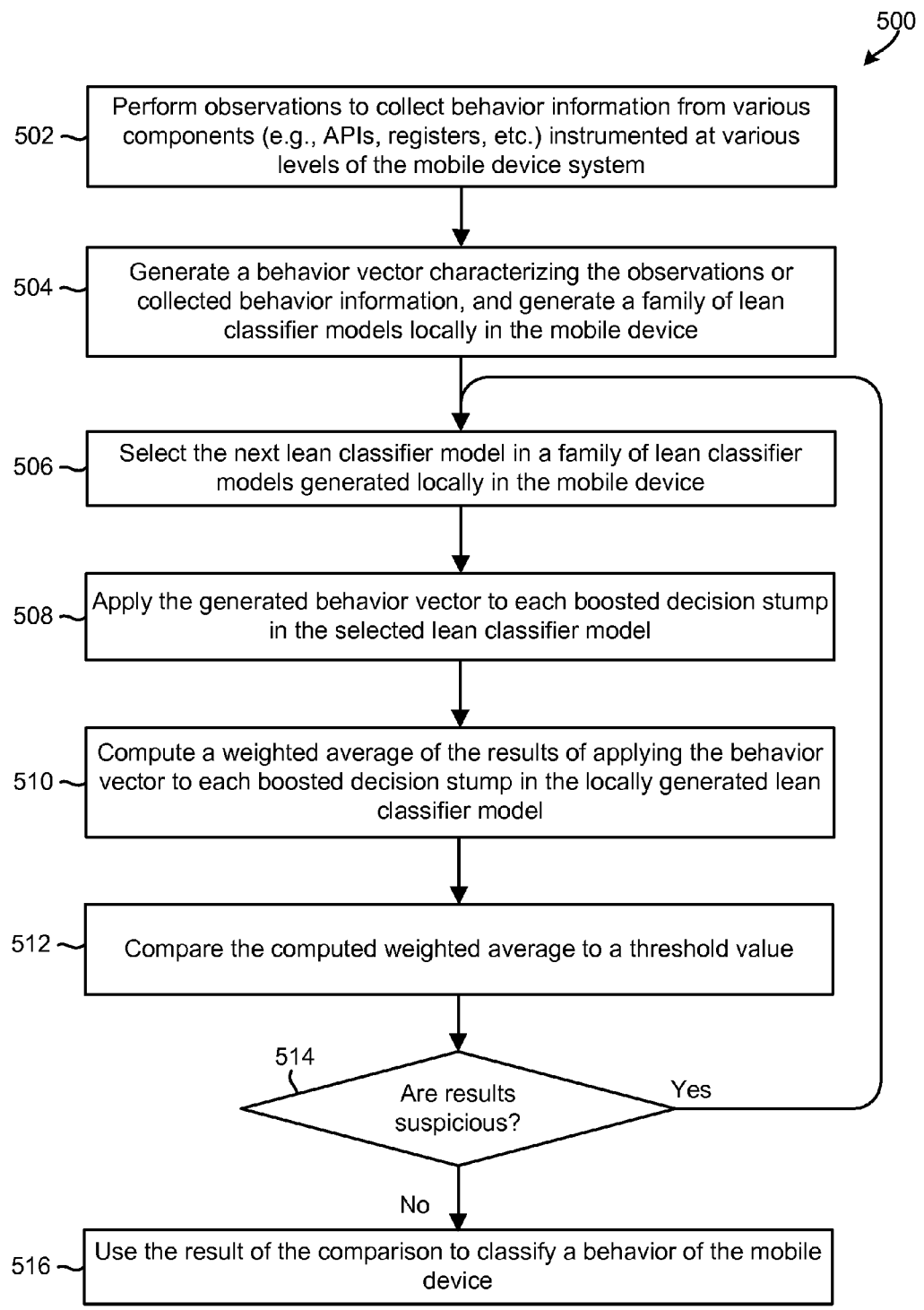
FIG. 5 is a process flow diagram illustrating an aspect mobile device method of generating user-specific or lean classifier models in the computing device.

FIG. 5 illustrates an aspect method 500 of using a family of lean classifier model to classify a behavior of the mobile device. Method 500 may be performed by a device processor of a mobile or resource constrained computing device.

In block 502, the device processor my perform observations to collect behavior information from various components that are instrumented at various levels of the mobile device system. In an aspect, this may be accomplished via the behavior observer module 202 discussed above with reference to FIG. 2. In block 504, the device processor may generate a behavior vector characterizing the collected behavior information and/or a mobile device behavior. Also in block 504, the device processor may use a full classifier model received from a network server to generate a lean classifier model or a family of lean classifier models of varying levels of complexity (or "leanness"). To accomplish this, the device processor may cull a family of boosted decision stumps included in the full classifier model to generate lean classifier models that include a reduced number of boosted decision stumps and/or evaluate a limited number of test conditions. In an aspect, one or more of the lean classifier models may be user-specific classifier models.

In block 506, the device processor may select the leanest classifier in the family of lean classifier models (i.e., the model based on the fewest number of different mobile device states, features, behaviors, or conditions) that has not yet been evaluated or applied by the mobile device. In an aspect, this may be accomplished by the device processor selecting the first classifier model in an ordered list of classifier models. In block 508, the device processor may apply collected behavior information or behavior vectors to each boosted decision stump in the selected lean classifier model. Because boosted decision stumps are binary decisions and the lean classifier model is generated by selecting many binary decisions that are based on the same test condition, the process of applying a behavior vector to the boosted decision stumps in the lean classifier model may be performed in a parallel operation. Alternatively, the behavior vector may be truncated or filtered to just include the limited number of test condition parameters included in the lean classifier model, thereby further reducing the computational effort in applying the model.

In block 510, the device processor may compute or determine a weighted average of the results of applying the collected behavior information to each boosted decision stump in the lean classifier model. In block 512, the device processor may compare the computed weighted average to a threshold value. In determination block 514, the device processor may determine whether the results of this comparison and/or the results generated by applying the selected lean classifier model are suspicious. For example, the device processor may determine whether these results may be used to classify a behavior as either malicious or benign with a high degree of confidence, and if not treat the behavior as suspicious.

If the device processor determines that the results are suspicious (e.g., determination block 514="Yes"), the device processor may repeat the operations in blocks 506-512 to select and apply a stronger (i.e., less lean) classifier model that evaluates more device states, features, behaviors, or conditions until the behavior is classified as malicious or benign with a high degree of confidence. If the device processor determines that the results are not suspicious (e.g., determination block 514="No"), such as by determining that the behavior can be classified as either malicious or benign with a high degree of confidence, in block 516, the device processor may use the result of the comparison generated in block 512 to classify a behavior of the mobile device as benign or potentially malicious.

In an alternative aspect method, the operations described above may be accomplished by sequentially selecting a boosted decision stump that is not already in the lean classifier model; identifying all other boosted decision stumps that depend upon the same mobile device state, feature, behavior, or condition as the selected decision stump (and thus can be applied based upon one determination result); including in the lean classifier model the selected and all identified other boosted decision stumps that that depend upon the same mobile device state, feature, behavior, or condition; and repeating the process for a number of times equal to the determined number of test conditions. Because all boosted decision stumps that depend on the same test condition as the selected boosted decision stump are added to the lean classifier model each time, limiting the number of times this process is performed will limit the number of test conditions included in the lean classifier model.

Figure 6:
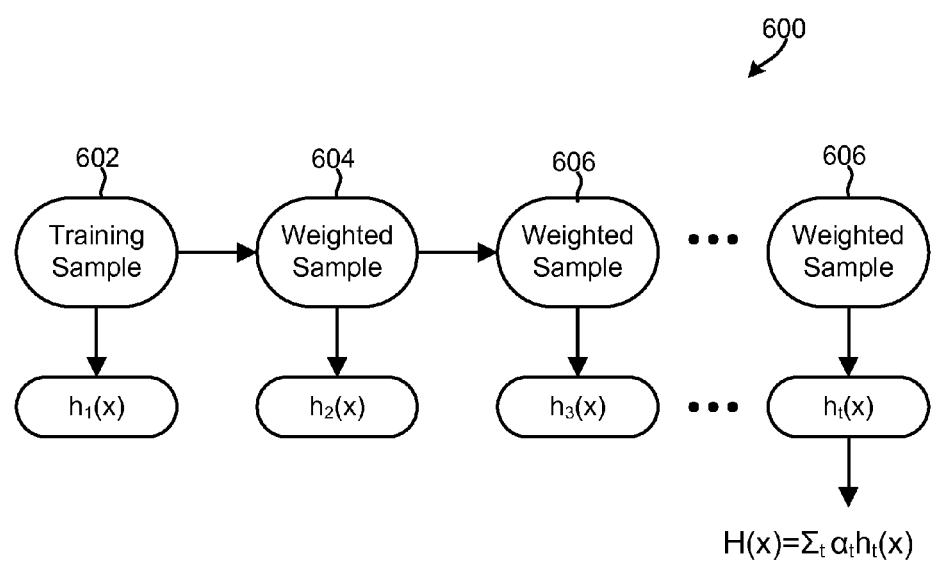
FIG. 6 is an illustration of example boosted decision stumps that may be generated by an aspect server processor and used by a device processor to generate user-specific or lean classifier models.

FIG. 6 illustrates an example method 600 suitable for generating a decision tree/classifier that is suitable for use in accordance with various aspects. Method 600 may be performed by a device processor of a mobile or resource constrained computing device. In block 602, the device processor may generate and/or execute a decision tree/classifier, collect a training sample from the execution of the decision tree/classifier, and generate a new classifier model (h1($x$)) based on the training sample. The training sample may include information collected from previous observations or analysis of mobile device behaviors, software applications, or processes in the mobile device. The training sample and/or new classifier model (h1($x$)) may be generated based the types of question or test conditions included in previous classifiers and/or based on accuracy or performance characteristics collected from the execution/application of previous data/behavior models or classifiers.

In block 604, the device processor may boost (or increase) the weight of the entries that were misclassified by the generated decision tree/classifier (h1($x$)) to generate a second new tree/classifier (h2($x$)). In an aspect, the training sample and/or new classifier model (h2($x$)) may be generated based on the mistake rate of a previous execution or use (h1($x$)) of a classifier. In an aspect, the training sample and/or new classifier model (h2($x$)) may be generated based on attributes determined to have that contributed to the mistake rate or the misclassification of data points in the previous execution or use of a classifier.

In an aspect, the misclassified—entries may be weighted based on their relatively accuracy or effectiveness. In operation 606, the processor may boost (or increase) the weight of the entries that were misclassified by the generated second tree/classifier (h2($x$)) to generate a third new tree/classifier (h3($x$)). In operation 608, the operations of 604-606 may be repeated to generate "t" number of new tree/classifiers ($h_t(x)$).

By boosting or increasing the weight of the entries that were misclassified by the first decision tree/classifier (h1($x$)), the second tree/classifier (h2($x$)) may more accurately classify the entities that were misclassified by the first decision tree/classifier (h1($x$)), but may also misclassify some of the entities that where correctly classified by the first decision tree/classifier (h1($x$)). Similarly, the third tree/classifier (h3($x$)) may more accurately classify the entities that were misclassified by the second decision tree/classifier (h2($x$)) and misclassify some of the entities that where correctly classified by the second decision tree/classifier (h2($x$)). That is, generating the family of tree/classifiers h1($x$)-$h_t(x)$ may not result in a system that converges as a whole, but results in a number of decision trees/classifiers that may be executed in parallel.

Figure 7:
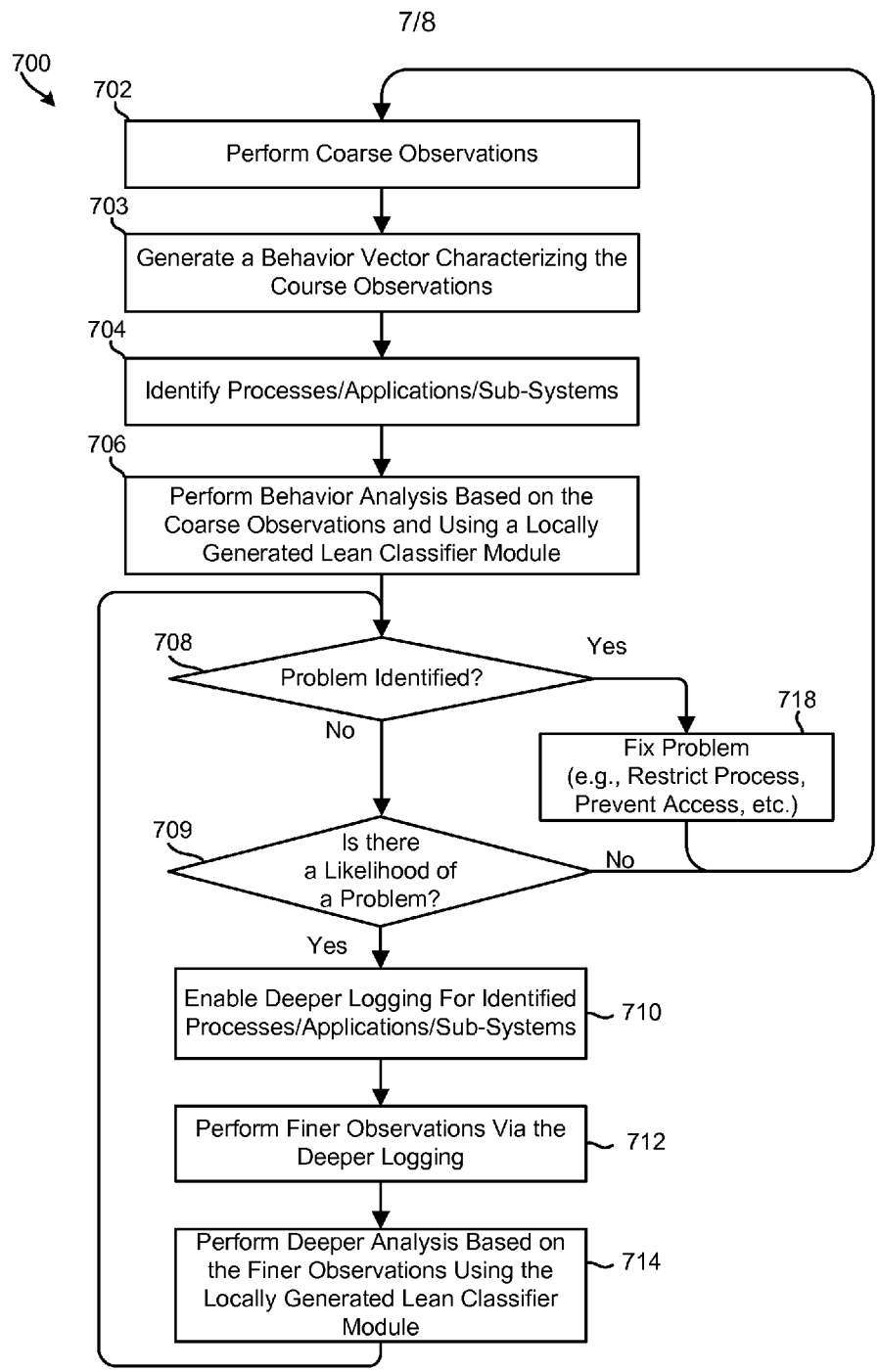
FIG. 7 is a process flow diagram illustrating an aspect method for performing adaptive observations on mobile devices.

FIG. 7 illustrates an example method 700 for performing dynamic and adaptive observations in accordance with an aspect. In block 702, the device processor may perform coarse observations by monitoring/observing a subset of a large number of factors, behaviors, and activities that could contribute to the mobile device's degradation. In block 703, the device processor may generate a behavior vector characterizing the coarse observations and/or the mobile device behavior based on the coarse observations. In block 704, the device processor may identify subsystems, processes, and/or applications associated with the coarse observations that may potentially contribute to the mobile device's degradation. This may be achieved, for example, by comparing information received from multiple sources with contextual information received from sensors of the mobile device. In block 706, the device processor may perform behavioral analysis operations based on the coarse observations.

In determination block 708, the device processor may determine whether suspicious behaviors or potential problems can be identified and corrected based on the results of the behavioral analysis. When the device processor determines that the suspicious behaviors or potential problems can be identified and corrected based on the results of the behavioral analysis (i.e., determination block 708="Yes"), in block 718, the processor may initiate a process to correct the behavior and return to block 702 to perform additional coarse observations.

When the device processor determines that the suspicious behaviors or potential problems cannot be identified and/or corrected based on the results of the behavioral analysis (i.e., determination block 708="No"), in determination block 709 the device processor may determine whether there is a likelihood of a problem. In an aspect, the device processor may determine that there is a likelihood of a problem by computing a probability of the mobile device encountering potential problems and/or engaging in suspicious behaviors, and determining whether the computed probability is greater than a predetermined threshold. When the device processor determines that the computed probability is not greater than the predetermined threshold and/or there is not a likelihood that suspicious behaviors or potential problems exist and/or are detectable (i.e., determination block 709="No"), the processor may return to block 702 to perform additional coarse observations.

When the device processor determines that there is a likelihood that suspicious behaviors or potential problems exist and/or are detectable (i.e., determination block 709="Yes"), in block 710, the device processor may perform deeper logging/observations or final logging on the identified subsystems, processes or applications. In block 712, the device processor may perform deeper and more detailed observations on the identified subsystems, processes or applications. In block 714, the device processor may perform further and/or deeper behavioral analysis based on the deeper and more detailed observations. In determination block 708, the device processor may again determine whether the suspicious behaviors or potential problems can be identified and corrected based on the results of the deeper behavioral analysis. When the device processor determines that the suspicious behaviors or potential problems cannot be identified and corrected based on the results of the deeper behavioral analysis (i.e., determination block 708="No"), the processor may repeat the operations in blocks 710-714 until the level of detail is fine enough to identify the problem or until it is determined that the problem cannot be identified with additional detail or that no problem exists.

When the device processor determines that the suspicious behaviors or potential problems can be identified and corrected based on the results of the deeper behavioral analysis (i.e., determination block 708="Yes"), in block 718, the device processor may perform operations to correct the problem/behavior, and the processor may return to block 702 to perform additional operations.

In an aspect, as part of blocks 702-718 of method 700, the device processor may perform real-time behavior analysis of the system's behaviors to identify suspicious behaviors from limited and coarse observations, to dynamically determine the behaviors to observe in greater detail, and to dynamically determine the precise level of detail required for the observations. This enables the device processor to efficiently identify and prevent problems from occurring, without requiring the use of a large amount of processor, memory, or battery resources on the device.

The various aspects improve upon existing solutions by using behavior analysis and/or machine learning techniques (as opposed to a permissions, policy, or rules-based approaches) to monitor and analyze the collective behavior of a select group of software applications. The use of behavior analysis or machine learning techniques is important because modern computing devices are highly configurable and complex systems, and the factors that are most important for determining whether software applications are colluding may be different in each device. Further, different combinations of device features/factors may require an analysis in each device in order for that device to determine whether software applications are colluding. Yet, the precise combination of features/factors that require monitoring and analysis often can only be determined using information obtained from the specific computing device in which the activity or activities is/are performed and at the time the activity/activities is/are underway. For these and other reasons, existing solutions are not adequate for monitoring, detecting, and characterizing the collective behavior of, or the relationships between, a plurality of software applications in the computing device, in real-time, while the behavior is underway, and without consuming a significant amount of the computing device's processing, memory, or power resources.

Figure 8:
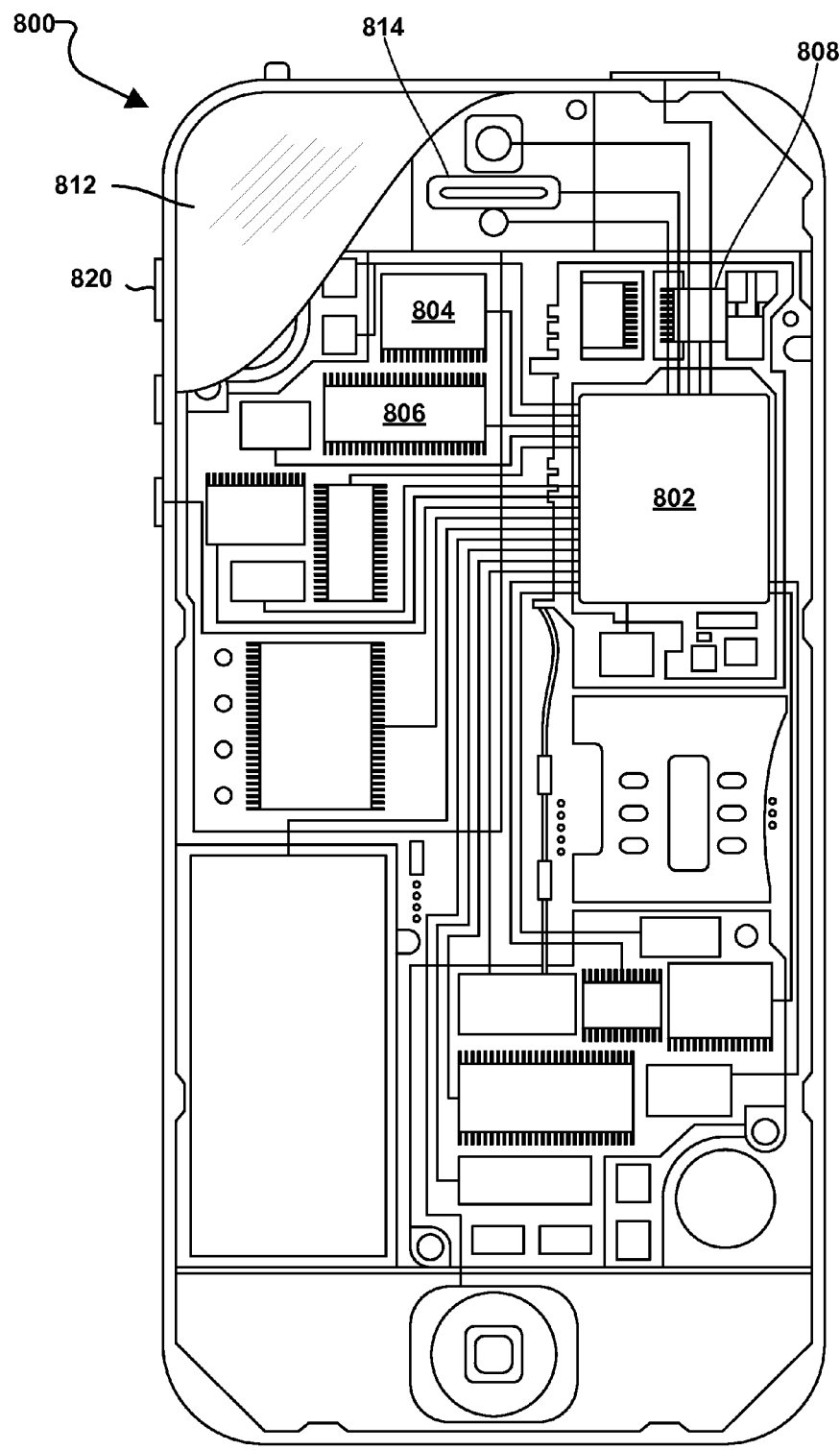
FIG. 8 is a component block diagram of a mobile device suitable for use in an aspect.

The various aspects, including the aspect discussed above with reference to FIGS. 2-7, may be implemented on a variety of computing devices, an example of which is illustrated in FIG. 8 in the form of a smartphone. A smartphone 800 may include a processor 802 coupled to internal memory 804, a display 812, and to a speaker 814. Additionally, the smartphone 800 may include an antenna for sending and receiving electromagnetic radiation that may be connected to a wireless data link and/or cellular telephone transceiver 808 coupled to the processor 802. Smartphones 800 typically also include menu selection buttons or rocker switches 820 for receiving user inputs.

A typical smartphone 800 also includes a sound encoding/decoding (CODEC) circuit 806, which digitizes sound received from a microphone into data packets suitable for wireless transmission and decodes received sound data packets to generate analog signals that are provided to the speaker to generate sound. Also, one or more of the processor 802, wireless transceiver 808 and CODEC 806 may include a digital signal processor (DSP) circuit (not shown separately).

The processor 802 may be any programmable microprocessor, microcomputer or multiple processor chip or chips that can be configured by software instructions (applications) to perform a variety of functions, including the functions of the various aspects described below. In some mobile devices, multiple processors 802 may be provided, such as one processor dedicated to wireless communication functions and one processor dedicated to running other applications. Typically, software applications may be stored in the internal memory 804 before they are accessed and loaded into the processor 802. The processor 802 may include internal memory sufficient to store the application software instructions. In various aspects, the processor 802 may be a device processor, processing core, or an SOC (such as the example SOC 100 illustrated in FIG. 1). In an aspect, the smartphone 800 may include an SOC, and the processor 802 may be one of the processors included in the SOC (such as one of the processors 101, 104, 106, 108, 110 illustrated in FIG. 1).

As used in this application, the terms "component," "module," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution, and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

Many mobile computing devices operating system kernels are organized into a user space (where non-privileged code runs) and a kernel space (where privileged code runs). This separation is of particular importance in Android® and other general public license (GPL) environments where code that is part of the kernel space must be GPL licensed, while code running in the user-space may not be GPL licensed. It should be understood that the various software components/modules discussed here may be implemented in either the kernel space or the user space, unless expressly stated otherwise.

The foregoing method descriptions and the process flow diagrams are provided merely as illustrative examples, and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more processor-executable instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of analyzing a device behavior in a computing device, comprising:
    monitoring, by a processor of the computing device, activities of a software application operating on the computing device to generate user-persona information that characterizes a user of the computing device, the generated user-persona information including information that characterizes the user's mood;
    using the generated user-persona information to select two or more device features;
    monitoring the selected two or more device features to collect behavior information;
    determining whether the user's mood is relevant to analyzing the behavior information collected by monitoring the selected two or more device features; and
    generating a classifier model that includes a plurality of one-level decision trees that each evaluate a device feature in relation to the user's mood in response to determining that the user's mood is relevant to analyzing the behavior information collected by monitoring the selected two or more device features;
    generating a behavior vector that correlates the behavior information for which the user's mood is relevant to the user's mood at the time the behavior information was collected;
    applying the generated behavior vector to the classifier model to generate an analysis result; and
    using the generated analysis result to determine whether the device behavior is non-benign.

2. The method of claim 1, wherein using the generated user-persona information to select the two or more device features comprises:

selecting the two or more device features so as to balance tradeoffs between performance and security.

3. The method of claim 1, wherein using the generated user-persona information to select the two or more device features comprises:
selecting the two or more device features that are most relevant to determining whether the device behavior is not consistent with a pattern of ordinary usage of the computing device by the user.

4. The method of claim 1,
wherein generating the classifier model that includes the plurality of one-level decision trees that each evaluate a device feature in relation to the user's mood comprises generating a user-specific classifier model that evaluates the selected two or more device features, and
wherein applying the generated behavior vector to the classifier model to generate the analysis result comprises applying the generated behavior vector to the user-specific classifier model to generate the analysis result.

5. The method of claim 4,
wherein generating the user-specific classifier model comprises:
receiving a full classifier model that includes a plurality of test conditions;
identifying test conditions in the plurality of test conditions that evaluate the determined device features; and
generating the user-specific classifier model to include identified test conditions;
wherein applying the generated behavior vector to the user-specific classifier model comprises:
applying the generated behavior vector to the user-specific classifier model so as to evaluate each test condition included in the user-specific classifier model; and
computing a weighted average of each result of evaluating test conditions in the user-specific classifier model; and
wherein using the generated analysis result to determine whether the device behavior is non-benign comprises determining whether the device behavior is non-benign based on the computed weighted average.

6. The method of claim 1, wherein monitoring the activities of the software application operating on the computing device to generate the user-persona information that characterizes the user of the computing device further comprises monitoring a user-interaction between the user and the software application.

7. A computing device, comprising:
a processor configured with processor-executable instructions to perform operations comprising:
monitoring activities of a software application operating on the computing device to generate user-persona information that characterizes a user of the computing device, the generated user-persona information including information that characterizes the user's mood;
using the generated user-persona information to select two or more device features;
monitoring the selected two or more device features to collect behavior information;
determining whether the user's mood is relevant to analyzing the behavior information collected by monitoring the selected two or more device features; and
generating a classifier model that includes a plurality of one-level decision trees that each evaluate a device feature in relation to the user's mood in response to determining that the user's mood is relevant to analyzing the behavior information collected by monitoring the selected two or more device features;
generating a behavior vector that correlates the behavior information for which the user's mood is relevant to the user's mood at the time the behavior information was collected;
applying the generated behavior vector to the classifier model to generate an analysis result; and
using the generated analysis result to determine whether a device behavior is non-benign.

8. The computing device of claim 7, wherein the processor is configured with processor-executable instructions to perform operations such that using the generated user-persona information to select the two or more device features comprises:
selecting the two or more device features so as to balance tradeoffs between performance and security.

9. The computing device of claim 7, wherein the processor is configured with processor-executable instructions to perform operations such that using the generated user-persona information to select the two or more device features comprises:
selecting the two or more device features that are most relevant to determining whether the device behavior is not consistent with a pattern of ordinary usage of the computing device by the user.

10. The computing device of claim 7, wherein:
the processor is configured with processor-executable instructions to perform operations such that generating the classifier model that includes the plurality of one-level decision trees that each evaluate a device feature in relation to the user's mood comprises generating a user-specific classifier model that evaluates the selected two or more device features; and
the processor is configured with processor-executable instructions to perform operations such that applying the generated behavior vector to the classifier model generate the analysis result comprises applying the generated behavior vector to the user-specific classifier model to generate the analysis result.

11. The computing device of claim 10,
wherein the processor is configured with processor-executable instructions to perform operations such that generating the user-specific classifier model comprises:
receiving a full classifier model that includes a plurality of test conditions;
identifying test conditions in the plurality of test conditions that evaluate the determined device features; and
generating the user-specific classifier model to include identified test conditions;
wherein the processor is configured with processor-executable instructions to perform operations such that applying the generated behavior vector to the user-specific classifier model to determine whether the device behavior is non-benign comprises:
applying the generated behavior vector to the user-specific classifier model so as to evaluate each test condition included in the user-specific classifier model; and
computing a weighted average of each result of evaluating test conditions in the user-specific classifier model; and wherein the processor is configured with processor-executable instructions to perform operations such that using the generated analysis result to determine whether the device behavior is non-benign comprises determining whether the device behavior is non-benign based on the computed weighted average.

12. A non-transitory computer readable storage medium having stored thereon processor-executable software instructions configured to cause a processor of a computing device to perform operations for analyzing a device behavior in the computing device, the operations comprising:
monitoring activities of a software application operating on the computing device to generate user-persona information that characterizes a user of the computing device, the generated user-persona information including information that characterizes the user's mood;
using the generated user-persona information to select two or more device features;
monitoring the selected two or more device features to collect behavior information;
determining whether the user's mood is relevant to analyzing the behavior information collected by monitoring the selected two or more device features; and
generating a classifier model that includes a plurality of one-level decision trees that each evaluate a device feature in relation to the user's mood in response to determining that the user's mood is relevant to analyzing the behavior information collected by monitoring the selected two or more device features;
generating a behavior vector that correlates the behavior information for which the user's mood is relevant to the user's mood at the time the behavior information was collected;
applying the generated behavior vector to the classifier model to generate an analysis result; and
using the generated analysis result to determine whether the device behavior is non-benign.

13. The non-transitory computer readable storage medium of claim 12, wherein the stored processor-executable software instructions are configured to cause a processor to perform operations such that using the generated user-persona information to select the two or more device features comprises:
selecting the two or more device features to be monitored so as to balance tradeoffs between performance and security.

14. The non-transitory computer readable storage medium of claim 12, wherein the stored processor-executable software instructions are configured to cause a processor to perform operations such that using the generated user-persona information to select the two or more device features comprises:
selecting the two or more device features that are most relevant to determining whether the device behavior is not consistent with a pattern of ordinary usage of the computing device by the user.

15. The non-transitory computer readable storage medium of claim 12, wherein:
the stored processor-executable software instructions are configured to cause a processor to perform operations such that generating the classifier model that includes the plurality of one-level decision trees that each evaluate a device feature in relation to the user's mood comprises generating a user-specific classifier model that evaluates the selected two or more device features; and the stored processor-executable software instructions are configured to cause a processor to perform operations such that applying the generated behavior vector to the classifier model to generate the analysis result comprises applying the generated behavior vector to the user-specific classifier model to generate the analysis result.

16. The non-transitory computer readable storage medium of claim 15,
wherein the stored processor-executable software instructions are configured to cause a processor to perform operations such that generating the user-specific classifier model comprises:
receiving a full classifier model that includes a plurality of test conditions;
identifying test conditions in the plurality of test conditions that evaluate the determined device features; and
generating the user-specific classifier model to include identified test conditions;
wherein the stored processor-executable software instructions are configured to cause a processor to perform operations such that applying the generated behavior vector to the user-specific classifier model to determine whether the device behavior is non-benign comprises:
applying the generated behavior vector to the user-specific classifier model so as to evaluate each test condition included in the user-specific classifier model; and
computing a weighted average of each result of evaluating test conditions in the user-specific classifier model; and
wherein the stored processor-executable software instructions are configured to cause a processor to perform operations such that using the generated analysis result to determine whether the device behavior is non-benign comprises determining whether the device behavior is non-benign based on the computed weighted average.

17. A computing device, comprising:
means for monitoring activities of a software application operating on the computing device to generate user-persona information that characterizes a user of the computing device, the generated user-persona information including information that characterizes the user's mood;
means for using the generated user-persona information to select two or more device features;
means for monitoring the selected two or more device features to collect behavior information;
means for determining whether the user's mood is relevant to analyzing the behavior information collected by monitoring the selected two or more device features; and
means for generating a classifier model that includes a plurality of one-level decision trees that each evaluate a device feature in relation to the user's mood in response to determining that the user's mood is relevant to analyzing the behavior information collected by monitoring the selected two or more device features;
means for generating a behavior vector that correlates the behavior information for which the user's mood is relevant to the user's mood at the time the behavior information was collected;
means for applying the generated behavior vector to the classifier model to generate an analysis result; and
means for using the generated analysis result to determine whether a device behavior is non-benign.

18. The computing device of claim 17, wherein means for using the generated user-persona information to select the two or more device features comprises:
   selecting the two or more device features that are most relevant to determining whether the device behavior is not consistent with a pattern of ordinary usage of the computing device by the user.

19. The computing device of claim 17,
   wherein means for generating the classifier model that includes the plurality of one-level decision trees that each evaluate a device feature in relation to the user's mood comprises means for generating a user-specific classifier model that evaluates the selected two or more device features, and
   wherein means for applying the generated behavior vector to the classifier model to generate the analysis result comprises means for applying the generated behavior vector to the user-specific classifier model to generate the analysis result.

20. The computing device of claim 19,
   wherein means for generating the user-specific classifier model comprises:
      means for receiving a full classifier model that includes a plurality of test conditions;
      means for identifying test conditions in the plurality of test conditions that evaluate the determined device features; and
      means for generating the user-specific classifier model to include identified test conditions;
   wherein means for applying the generated behavior vector to the user-specific classifier model to generate the analysis result comprises:
      means for applying the generated behavior vector to the user-specific classifier model so as to evaluate each test condition included in the user-specific classifier model; and
      means for computing a weighted average of each result of evaluating test conditions in the user-specific classifier model; and
   wherein means for using the generated analysis result to determine whether the device behavior is non-benign comprises means for determining whether the device behavior is non-benign based on the computed weighted average.

* * * * *